United States Patent
Burnette et al.

(10) Patent No.: US 10,834,002 B2
(45) Date of Patent: *Nov. 10, 2020

(54) SYSTEMS AND METHODS FOR PACING DATA FLOWS

(71) Applicant: Opanga Networks, Inc., Seattle, WA (US)

(72) Inventors: John Burnette, Seattle, WA (US); Ben Hadorn, Seattle, WA (US); Jeffrey Harrang, Seattle, WA (US); David Gibbons, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,595

(22) Filed: Mar. 19, 2019

(65) Prior Publication Data
US 2019/0215273 A1 Jul. 11, 2019

Related U.S. Application Data

(63) Continuation of application No. 15/060,486, filed on Mar. 3, 2016, now Pat. No. 10,270,700.

(Continued)

(51) Int. Cl.
*H04L 12/825* (2013.01)
*H04L 12/26* (2006.01)
*H04L 12/801* (2013.01)

(52) U.S. Cl.
CPC .......... *H04L 47/25* (2013.01); *H04L 43/0882* (2013.01); *H04L 43/0888* (2013.01); *H04L 47/29* (2013.01)

(58) Field of Classification Search
CPC . H04L 43/0882; H04L 43/0888; H04L 47/79; H04L 47/25
See application file for complete search history.

(56) References Cited

U.S. PATENT DOCUMENTS

2011/0167170 A1* 7/2011 Kovvali ................ H04W 28/06
709/232
2012/0131222 A1 5/2012 Curtis et al.
(Continued)

FOREIGN PATENT DOCUMENTS

| CN | 102868671 A | 1/2013 |
|----|-------------|--------|
| JP | 2002237841 A | 8/2002 |

(Continued)

OTHER PUBLICATIONS

European Search Report and Written Opinion for European Application No. 16759533.9 dated Sep. 14, 2018.
(Continued)

*Primary Examiner* — Mansour Oveissi

(57) ABSTRACT

A method includes examining a first data packet transmitted to a first network equipment from a second network equipment. A data flow type of the first data packet is determined. If the data flow type is determined to be the first type of data flow, determining a delivery throughput of the first data packet to the first network equipment over a data flow path. The determined delivery performance of the first data packet is compared to an expected peak data throughput capacity for a data packet transmitted to the first network equipment from the second network equipment. Transmission of data packets to the first network equipment is paced if the comparison of the determined delivery performance and the expected peak data throughput capacity indicates a congestion exists over the data flow path.

20 Claims, 13 Drawing Sheets

Related U.S. Application Data

(60) Provisional application No. 62/127,753, filed on Mar. 3, 2015, provisional application No. 62/207,529, filed on Aug. 20, 2015, provisional application No. 62/277,320, filed on Jan. 11, 2016.

(56) References Cited

U.S. PATENT DOCUMENTS

| | | |
|---|---|---|
| 2014/0112150 A1 | 4/2014 | Ko et al. |
| 2014/0233421 A1 | 8/2014 | Matthews |
| 2014/0237118 A1 | 8/2014 | Matthews |
| 2014/0269319 A1 | 9/2014 | Decusatis et al. |
| 2014/0313909 A1 | 10/2014 | Doherty et al. |
| 2015/0023168 A1 | 1/2015 | Kotecha et al. |
| 2016/0081058 A1* | 3/2016 | Choi .................. H04W 52/267 370/329 |

FOREIGN PATENT DOCUMENTS

| | | | |
|---|---|---|---|
| JP | 2005184494 | A | 7/2005 |
| JP | 2008104018 | A | 5/2008 |
| JP | 2009027303 | A | 2/2009 |
| JP | 2010193334 | A | 9/2010 |

OTHER PUBLICATIONS

International Search Report and Written Opinion for PCT/US2016/020774, dated Mar. 3, 2016.

Rie Hayashi et al., "QoS Control Mechanism Based on Real-Time Measurement of Elephant Flows", IEICE Trans. Commun., Aug. 2007, pp. 2081-2089, vol. E90-B, No. 8, The Institute of Electronics, Information and Communication Engineers.

* cited by examiner

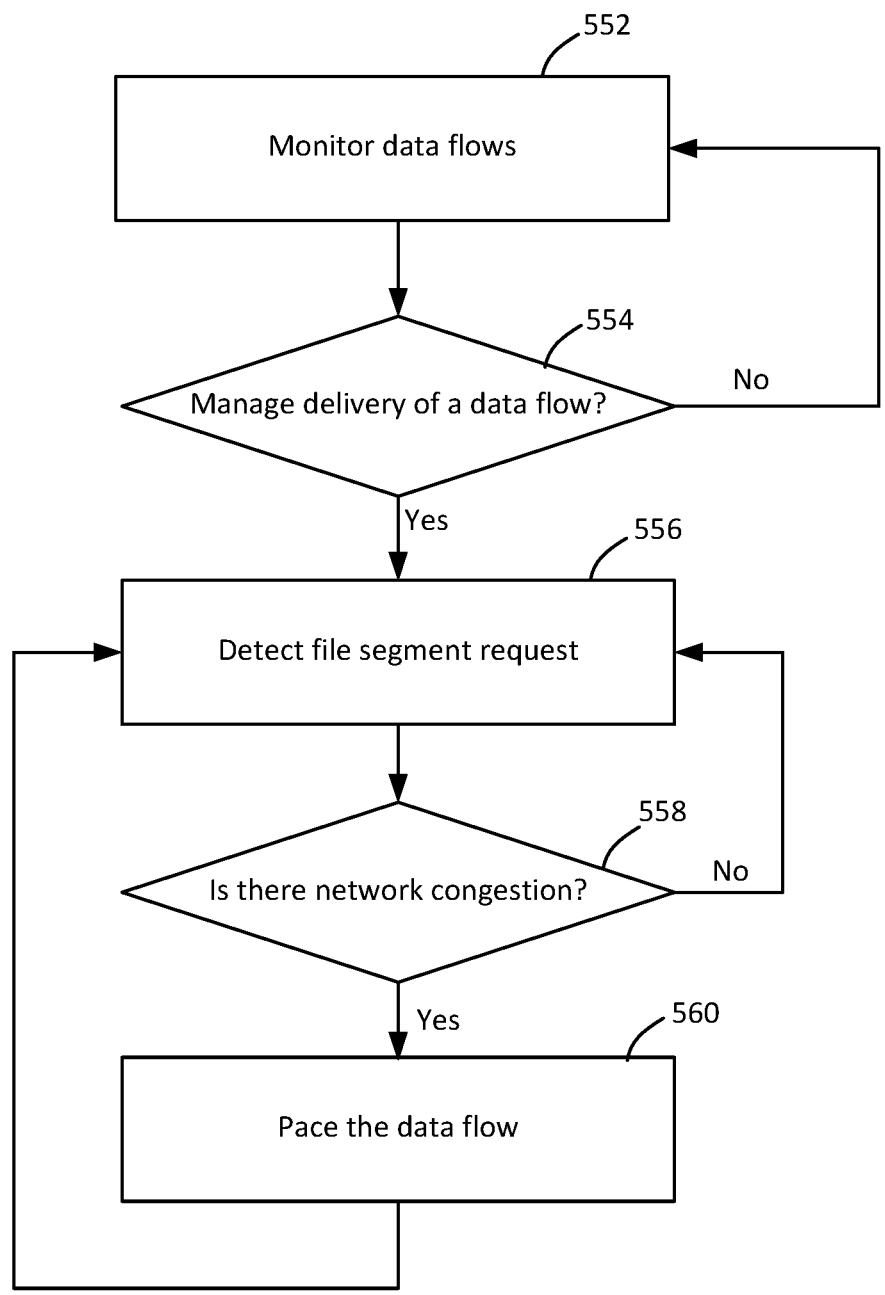

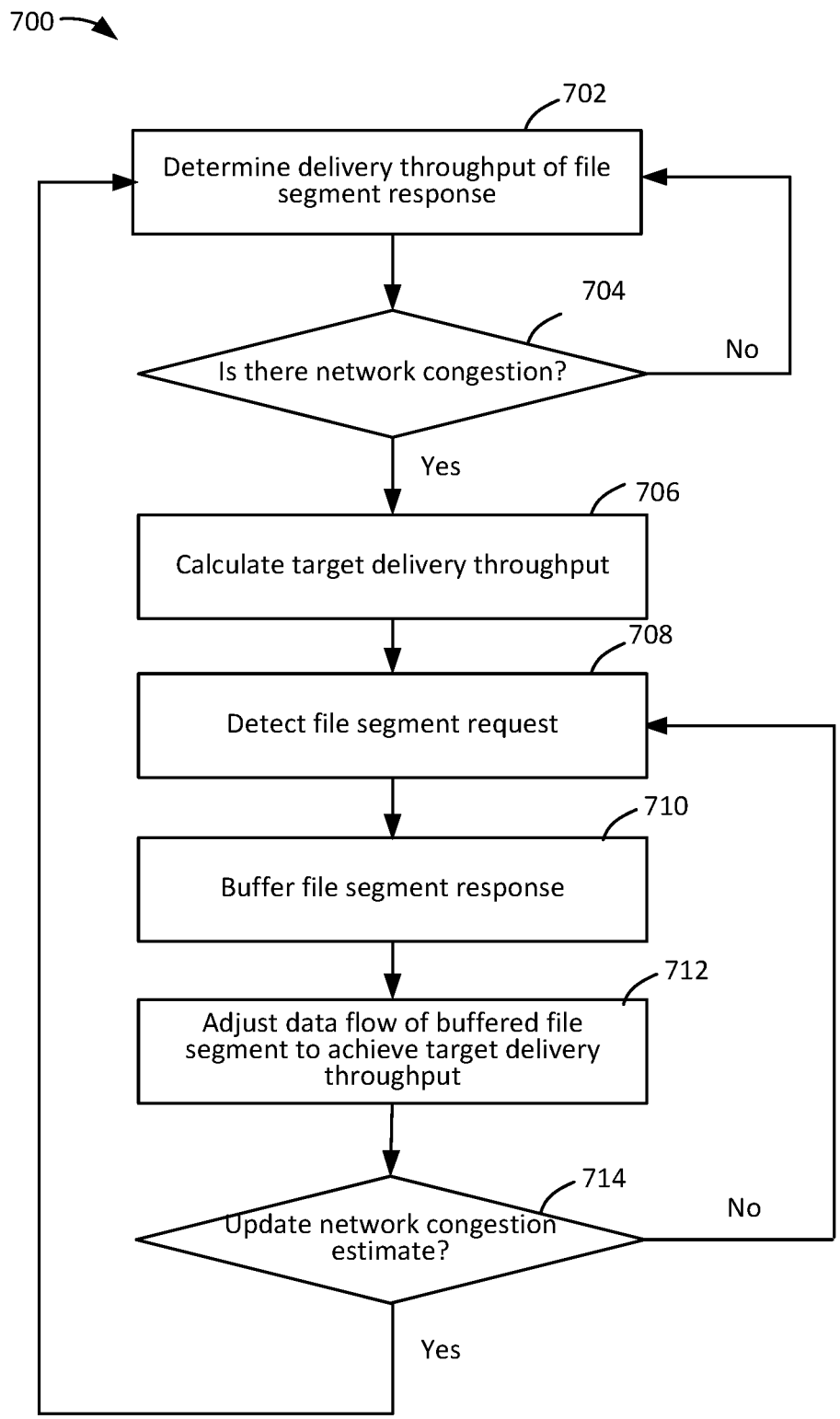

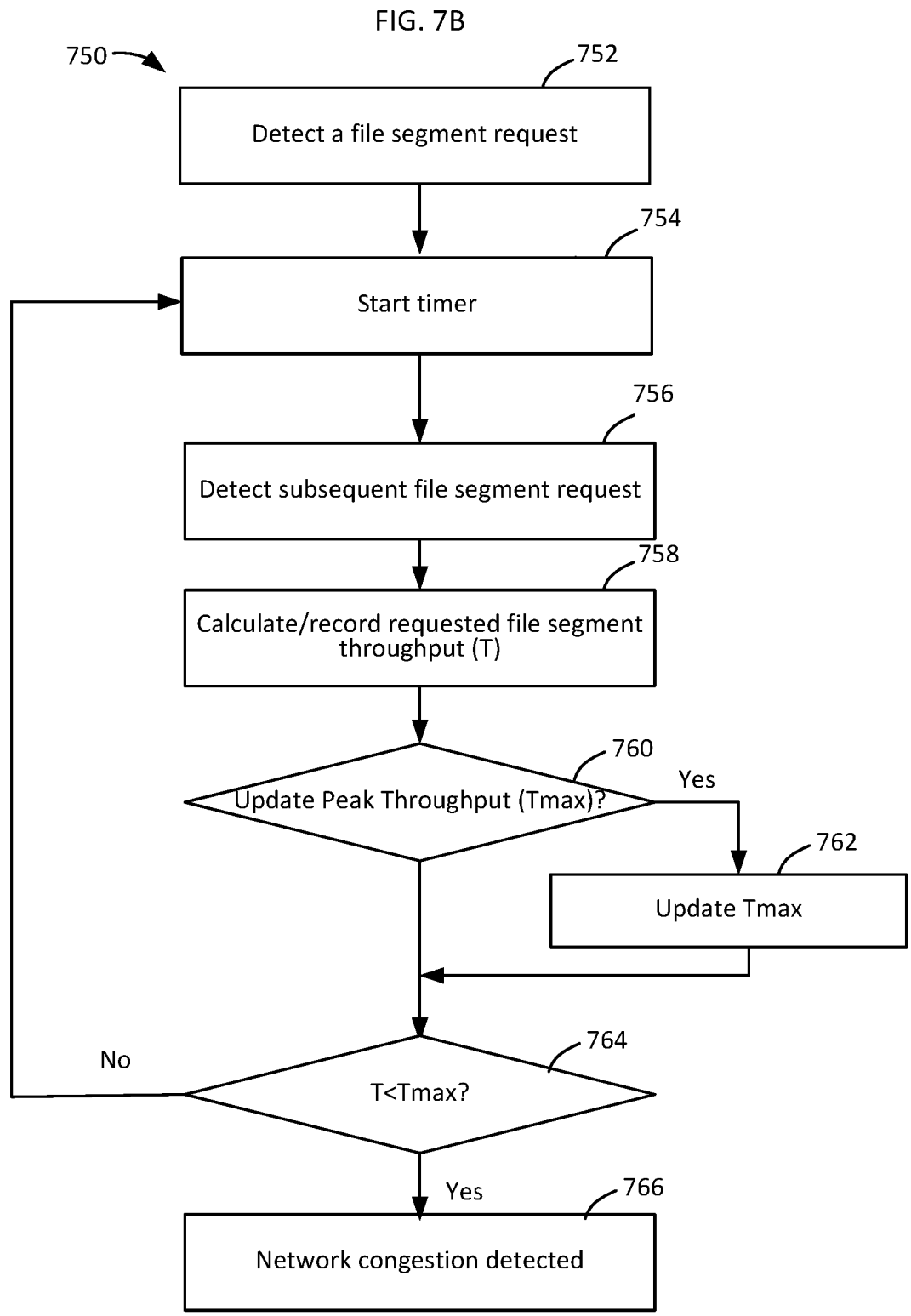

SYSTEMS AND METHODS FOR PACING DATA FLOWS

CROSS-REFERENCES TO RELATED APPLICATIONS

This application claims priority to and is a continuation of U.S. application Ser. No. 15/060,486, filed Mar. 3, 2016, which claims priority to and the benefit of U.S. Provisional Application No. 62/127,753, filed on Mar. 3, 2015, U.S. Provisional Application No. 62/207,529, filed on Aug. 20, 2015, and U.S. Provisional Application No. 62/277,320, filed on Jan. 11, 2016, the entire respective contents of which are incorporated herein by reference.

BACKGROUND

Efficient delivery of packet data content to users of a shared last-mile access network can be achieved by proper balancing of the network traffic capacity, volume of user traffic, and the overall user quality of experience provided to the users through applications transporting traffic through the network. As traffic volumes rise and this balance is not maintained, then either the network becomes too expensive to build or users suffer poor service.

One of the growing problems faced by today's data networks (which may include wireless, wired, and/or fiber networks) is the burden placed onto these data networks as a result of large content files being streamed or otherwise delivered across these networks. "Large" media content has the signature feature of consuming significant amounts of time and network resources during its delivery to or from an end user device. Commonly, consumer access networks are designed for delivery of short bursts of data and network resource use and are not intended for long-term continuous use such as streaming media content (e.g., audio, video, and/or other types of content data). Streaming media content is widely acknowledged to be a principal challenge to network traffic engineers who try to satisfy the peak use demands of many users with limited network resources. The typical outcome of widespread streaming adoption is network congestion which often is exhibited by slow network response for all users and their applications.

During peak periods of network usage (e.g., when a large volume of media content and/or other types of data are being transmitted over the network), the ability of the network to quickly and efficiently relay data from one network system to another network system becomes severely degraded. That is, as more and more network users connect to the network to download large amounts of data, the competition for the finite amount of available network bandwidth and resources (e.g., base stations, routers, servers, databases, and so forth) invariably results in each network user experiencing degraded services (e.g., slower upload and download speeds, data delivery and streaming interruptions).

SUMMARY

In some embodiments, a method includes selecting a data flow for management, the data flow being transmitted from a first network equipment to a second network equipment, determining, at a third network equipment, a delivery performance of the data flow being transmitted to the second network equipment; detecting network congestion based on the determined delivery performance of the data flow being transmitted to the second network equipment, and pacing, at the third network device and based on the detected network congestion, delivery of the data flow to the second network equipment by reducing a rate at which the data flow is delivered to the second network equipment.

In some embodiments, a transport manager system includes one or more processors, a network interface, a queue, and a storage communicatively coupled with each other, the storage storing computer executable instructions that, when executed by the one or more processors, cause the transport manager system to: determine a delivery performance of a data flow being transmitted from a first network equipment to a second network equipment, detect network congestion based on the determined delivery performance of the data flow, and pace, based on the detected network congestion, delivery of the data flow being transmitted to the second network equipment by reducing a rate at which the data flow is delivered to the second network equipment.

In some embodiments, a system includes one or more processors, a network interface, a queue, a flow detector logic unit configured to select a data flow for management, the data flow being transmitted from a first network equipment to a second network equipment, and a flow manager logic unit configured to: determine a delivery performance of the data flow being transmitted to the second network equipment, detect network congestion based on the determined delivery performance of the data flow being transmitted to the second network equipment, and pace, based on the detected network congestion, delivery of the data flow to the second network equipment by reducing a rate at which the data flow is delivered to the second network equipment.

BRIEF DESCRIPTION OF THE DRAWINGS

FIG. 5B is a high-level logic flow diagram of a process for selecting a data flow for management and for pacing the data flow according to an embodiment.

FIG. 7A is a high-level logic flow diagram of a process for managing the delivery throughput of a data flow according to an embodiment.

FIG. 7B is a high-level logic flow diagram of a process for determining delivery throughput of a file segment associated with a selected data flow and determining whether there is network congestion according to an embodiment.

DETAILED DESCRIPTION

Figure 1A:
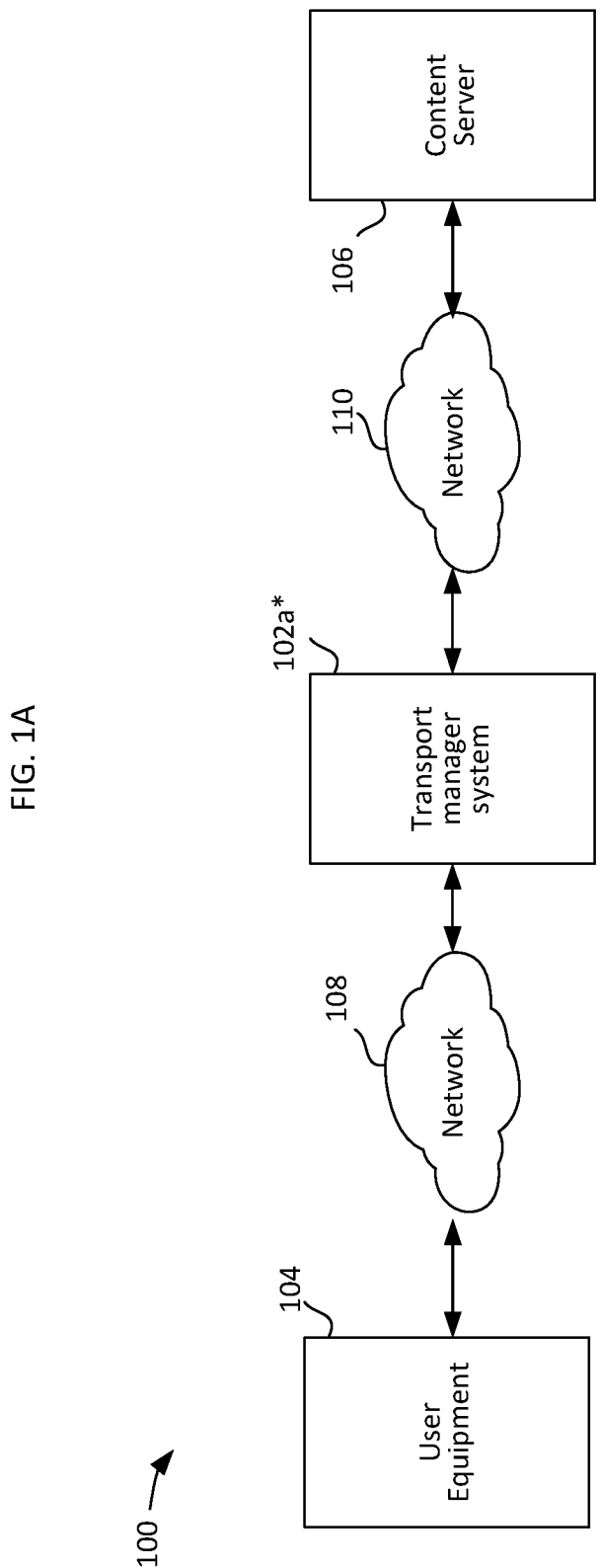
FIG. 1A illustrates an example network environment.

Systems and methods are described herein to select a data flow traversing through one or more data networks for management and that may have been determined to be using significant amounts of network resources. Upon detecting network congestion, the systems and methods may be designed to pace the delivery of the data flow by reducing the delivery rate (or target data rate) of the data flow to the destination. In some cases, the systems may include a transport manager system, while in other cases, the systems may include the transport manager system and a flow detector system. In some embodiments, the systems and methods may be implemented somewhere along a data flow path between a first network equipment, such as a content server, and a second network equipment, such as a user equipment. In some embodiments, and for purposes of the following description, a data flow may be defined as a flow of data packets associated with a particular data file, such as a media content file, which is transmitted from a particular network source to a particular network destination.

In some embodiments, the systems and methods may deliver packet data content across shared access networks in a manner that more evenly distributes over time aggregate user traffic, for example, by moving traffic from times of bottleneck network congestion into subsequent adjacent moments of surplus network capacity. The net effect of this redistribution of traffic may reduce intervals of peak usage and congestion (when the network is unable to supply enough throughput capacity for all users), which may result in higher allowed aggregate network utilization before network service quality degrades for end users of the shared access networks.

For purposes of the following description, the term "surplus network capacity" (e.g., idle capacity) is understood to mean shared network capacity (e.g., network bandwidth, network resources) that may be used by, for example, a transport manager system that transfers some or all of the streaming content data over a network, but that in the absence of such a usage is otherwise unused. In other words, "the surplus network capacity" may be deemed to be available network bandwidth (or network resources) that is in excess of the current aggregate network traffic load or demand. For example, if the network traffic capacity is X and the current aggregate network traffic load is Y, then the available surplus capacity is X-Y, where Y cannot be larger than X. One of the goals of using surplus network capacity is to use some or all of the surplus capacity X-Y to transfer content including streaming content, which implies that if the surplus capacity (X-Y) is zero, then the transfer slows or stops and yields the channel to other users' traffic sharing the same network. When the surplus capacity (X-Y) of a network is zero or approaches zero, the network is considered to be "congested" (i.e., network congestion).

In some cases, surplus network capacity in shared multi-user data networks is transient and can fluctuate randomly from moment to moment. Further, use of surplus capacity, as defined, is distinct from a fair-share or similarly competitive shared use of network capacity (e.g., when the aggregate traffic load exceeds the network capacity limit X, then each of N users sharing the network receives a X/N share of the network capacity).

When a data network is congested, the rate at which data packets (e.g., data flows) traversing through the network will typically degrade, resulting in less than optimal data throughput. One of the causes of network congestion is the presence or existence of "elephant flows" or other types of flows that are relatively burdensome in their use of network resources that include shared throughput capacity. Examples of elephant flows include, for example, packet data flows associated with media content (e.g., video and/or audio files) that use large fractions of network bandwidth. In some cases, an elephant flow may be defined as a data flow that consumes a portion of the total network bandwidth that is greater than some threshold level. In other cases, an elephant flow may be defined as a data flow having a data rate that exceeds some threshold amount. In still other cases, an elephant flow may be defined as a data flow that persists for longer than a threshold duration. Of course, the values of the threshold level and threshold amount may be a design choice based on a number of factors including, for example, types of data networks involved, number of end users, total network bandwidth, and so forth.

FIG. 1A illustrates an example network environment 100 according to an embodiment. As illustrated, the network environment 100 includes a transport manager system 102a*, a user equipment 104, a content server 106, a data network 108, and a data network 110. Note that in the following, "*" represents a wildcard. Thus, the following references to the transport manager system 102a*, for example, may refer to the transport manager system 102a* of FIG. 1A, as well as to the transport manager system 102a' of FIG. 2A or to the transport manager system 102a" of FIG. 2B, which are two different implementations of the transport manager system 102a* of FIG. 1A. Although not explicitly illustrated in FIG. 1A, one or more additional user equipment 104 and one or more additional content servers 106 may interface with the data network 108 and/or the data network 110.

In an embodiment, the user equipment 104 may be a desktop computer, a workstation, a set-top box, a work station, a mobile computing device such as a smartphone or a tablet computer, a wearable computing device such as a smartwatch or augmented reality glasses, or the like.

In an embodiment, the content server 106 may be, for example, a server that provides media content such as video and/or audio files and/or data files to other network nodes including, for example, the user equipment 104.

The two data networks 108 and 110 may be used as paths for exchanging data, in the form of data packets, between the user equipment 104, the transport manager system 102a*, and the content server 106. For example, when a media content file, such as a video or audio file, is being downloaded from the content server 106 to the user equipment 104, the media content file may be routed from the content server 106 to the user equipment 104 through the transport manager system 102a* and via the data networks 108 and 110. For example, the content server 106 may transmit a media content file to the user equipment 104 via the data networks 108 and 110 by transmitting data packets with headers that includes the network address (e.g., internet protocol IP address) of the user equipment 104 as the destination. In an embodiment, the two data networks 108 and 110 may be two distinct networks, or may be part of a single large functional network.

In some embodiments, the data network 108 may be an access network (AN) that communicatively links the transport manager system 102a* to the user equipment 104. For example, in some cases, the data network 108 may be one of a mobile cellular access network, such as, a second generation (2G) network, a third generation (3G) network, a long term evolution (LTE) network, a fifth generation (5G) network, and the like. In some cases, the data network 108 may include a core collection of sub-nodes that are linked to a radio access network (RAN). In some cases, portions of the data networks 108, 110, 114 may be a local area network or a data center, for example, a Serving Gateway Interface-Local Area Network (SGi-LAN) or Gateway Interface-Local Area Network (Gi-LAN) located at the border of a mobile network.

In some embodiments, the data network 110 that links the content server 106 to the transport manager system 102$a$* may be a wide-area network (WAN), which for illustrative purposes, may be considered to be the Internet.

In some embodiments, it may be assumed that at least a selected portion of packet data traffic between the content server 106 and the user equipment 104 passes through, or is in line with, the transport manager system 102$a$*. In order to facilitate traffic through the transport manager system 102$a$*, in one embodiment, the physical location for the transport manager system 102$a$* may be at the border traffic aggregation point(s) connecting the data network 108 (e.g., an access network such as a cellular or Wi-Fi network) with the data network 110 (e.g., WAN). For example, in $3^{rd}$ Generation Partnership Project (3GPP) standard mobile networks, the aggregate point may be part of the SGi-LAN, which connects to the data network (PDN)-Gateway core element (or alternately the Gi-LAN and Gateway GPRS support node (GGSN)-Gateway) and outwards to the Internet. However, in other embodiments, the transport manager system 102$a$* may be located elsewhere. In some embodiments, the transport manager system 102$a$* may be part of a Content Delivery Network (CDN) serving one or more ANs.

Figure 2A:
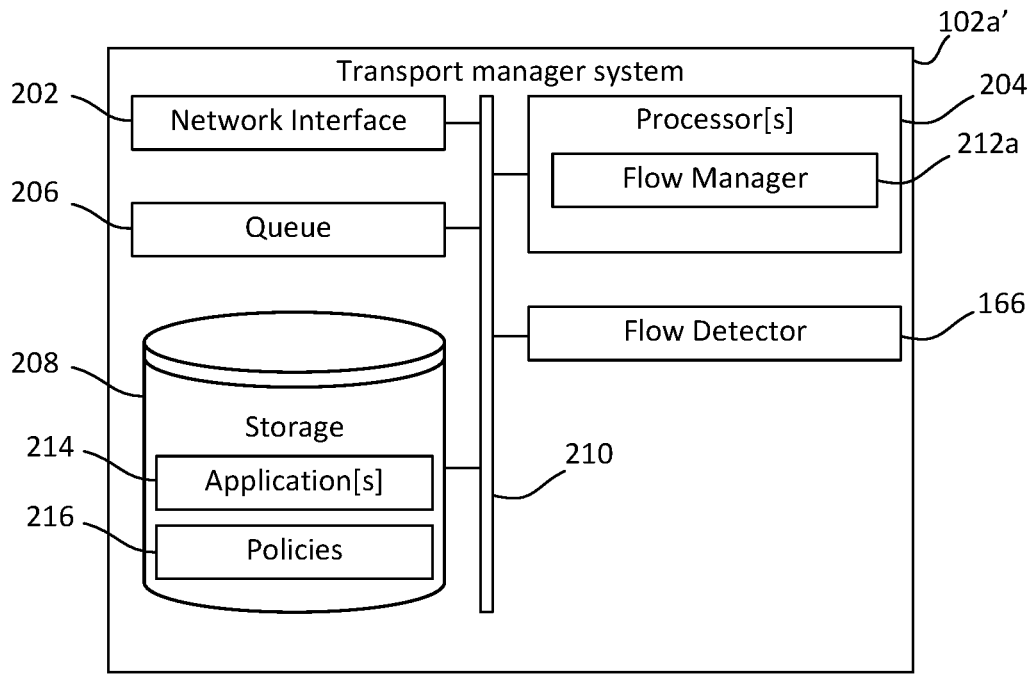
FIG. 2A is a block diagram of a transport manager system according to an embodiment.
Figure 2B:
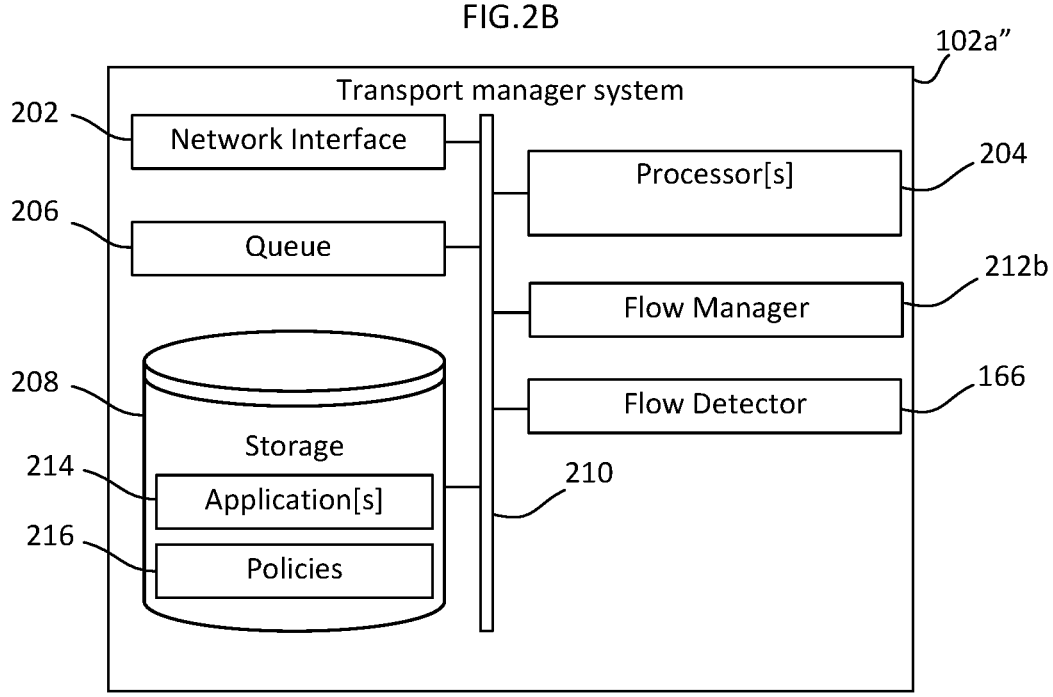
FIG. 2B is a block diagram of a transport manager system according to another embodiment.

FIGS. 2A and 2B illustrate two different implementations of the transport manager system 102$a$* of FIG. 1A, which are illustrated as transport manager system 102$a$' in FIG. 2A and as transport manager system 102$a$" in FIG. 2B. As illustrated in FIG. 2A, the transport manager system 102$a$' includes a network interface 202 (e.g., a network interface card or "NIC"), one or more processors 204, a queue 206 (e.g., a buffer), a flow detector 166, and storage 208 (e.g., volatile and/or non-volatile memory including, for example, random access memory (RAM), read only memory (ROM), flash memory, disc memory, and so forth) that are linked together via a bus 210. The storage 208 may store one or more applications 214 (e.g., computer readable instructions) and one or more policies 216 for selecting and/or determining which packet data flows should be managed.

The flow detector 166 may be designed to, among other features, monitor a plurality of data flows, and to select one or more of the data flows for further processing/management based on the one or more of the policies 216 stored in the storage 208 or from other sources. In various embodiments, the flow detector may be implemented using customized circuitry (e.g., application specific integrated circuit or ASIC), or by employing a combination of customized circuitry and software executed by programmable circuitry such as one or more processors.

As further illustrated in FIG. 2A, the transport manager system 102$a$' further includes a flow manager 212$a$, which may be designed to, among other functions, measure a delivery performance (e.g., delivery throughput or some of other delivery parameter) of a data flow (i.e., packet data flow). The flow manager 212$a$ may detect whether the network is congested based, at least in part, on the measured delivery performance of the data flow, and may pace the data flow, in response to detecting network congestion, by adjusting the delivery of the data flow to the destination (e.g., user equipment 104) in order to reduce the delivery rate of the data flow. In the embodiment illustrated in FIG. 2A, the flow manager 212$a$ is implemented by the one or more processors 204 (or other programmable circuitry) executing one or more computer readable programming instructions (e.g., application 214). The flow manager 212$a$, the flow manager 212$b$ of FIG. 2B, and the flow detector 166 of FIG. 1B are logic units that are each designed to perform the various functionalities to be described herein.

FIG. 2B illustrates another implementation of the transport manager system 102$a$* of FIG. 1A, illustrated in FIG. 2B as the transport manager system 102$a$". The transport manager system 102$a$" illustrated in FIG. 2B includes some of the same components as the transport manager system 102$a$' of FIG. 2A. Unlike the flow manager 212$a$ of FIG. 2A, however, the flow manager 212$b$ illustrated in FIG. 2B may be implemented using customized circuitry rather than being implemented using one or more processors 204 executing software (e.g., machine readable programming instructions). In still other embodiments, the flow manager 212$*$ of FIG. 2A or 2B may be implemented using a combination of customized circuitry and software executed by programmable circuitry (e.g., processor 204).

Figure 1B:
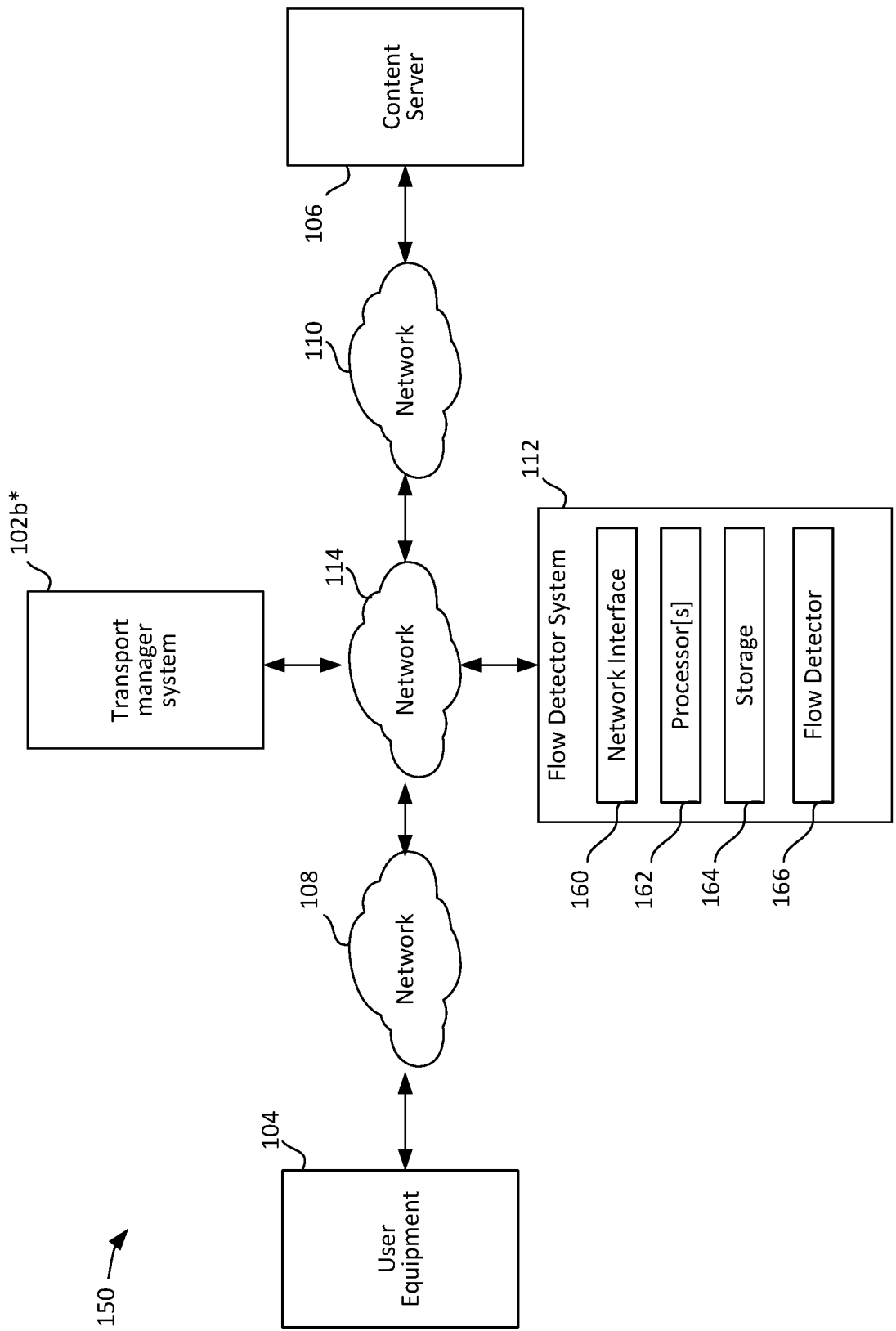
FIG. 1B illustrates another example network environment.
Figure 2C:
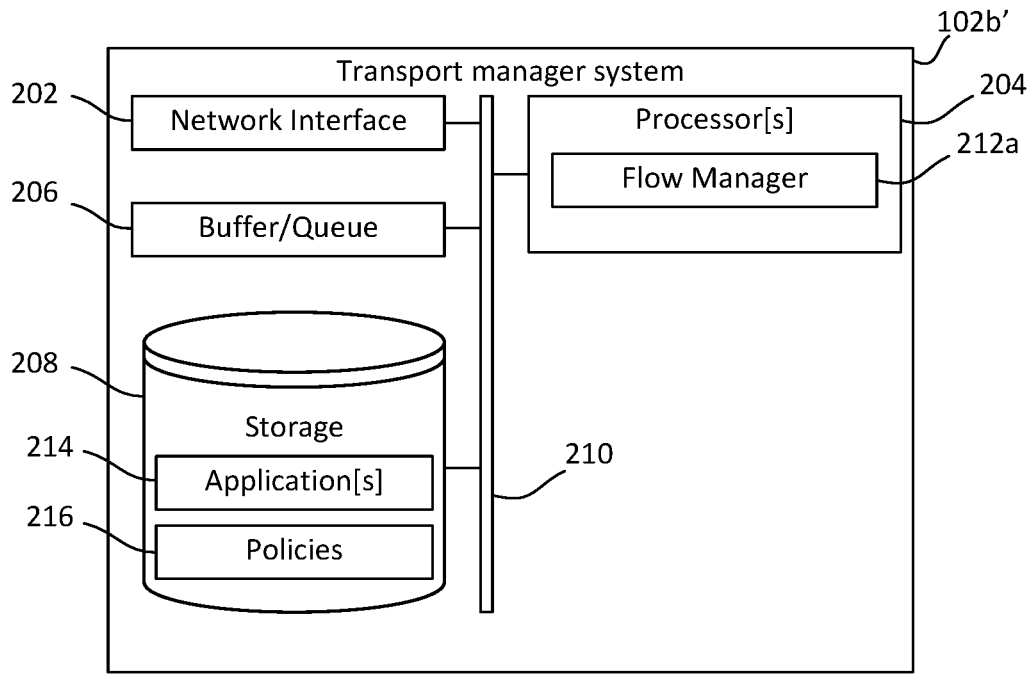
FIG. 2C is a block diagram of a transport manager system according to another embodiment.
Figure 2D:
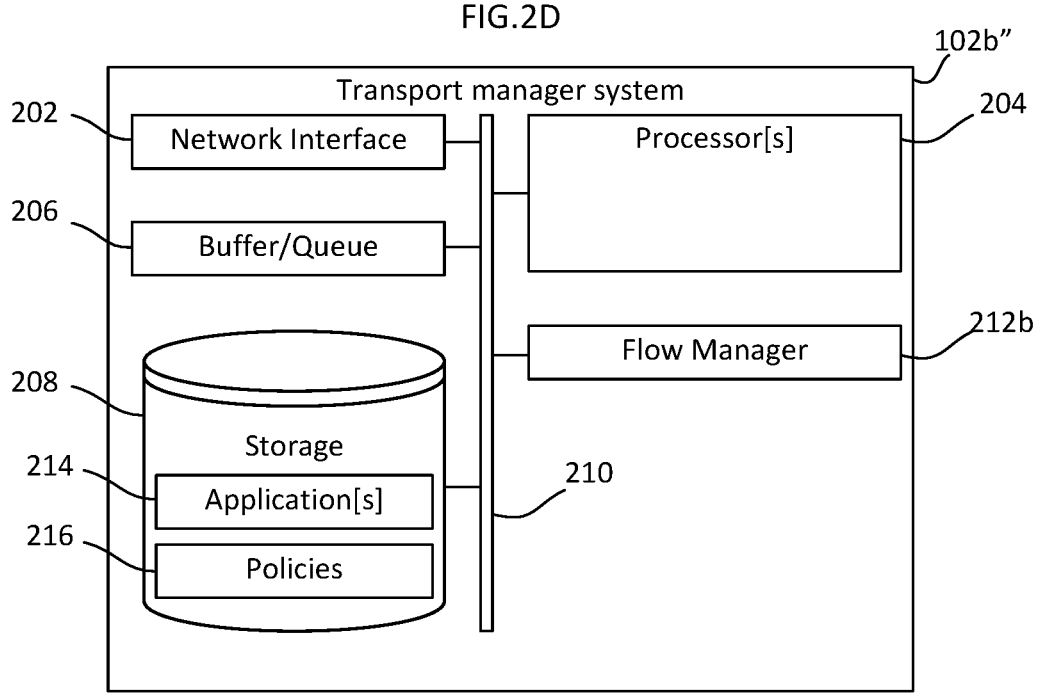
FIG. 2D is a block diagram of a transport manager system according to another embodiment.

FIG. 1B illustrates another example network environment 150 according to an embodiment. As illustrated, the network environment 150 includes a transport manager system 102$b$* that is designed to manage data flows between two network equipment (e.g., user equipment 104 and content server 106 similar to the transport manager system 102$a$* of FIG. 1A. FIGS. 2C and 2D illustrate two different implementations of the transport manager system 102$b$* of FIG. 1B, which is illustrated in FIG. 2C as transport manager system 102$b$' and in FIG. 2D as transport manager system 102$b$".

The transport manager system 102$b$* of FIG. 1B (i.e., the transport manager system 102$b$' of FIG. 2C or the transport manager system 102$b$' of FIG. 2D) includes components similar to those included in the transport manager system 102$a$* of FIG. 1A (i.e., the transport manager system 102$a$' of FIG. 2A or the transport manager system 102$a$" of FIG. 2D). However, unlike the transport manager system 102$a$* illustrated in FIGS. 1A, 2A, and 2B, the transport manager system 102$b$* of FIGS. 1B, 2C, and 2D does not include a flow detector 166. Instead, the flow detector 166 may be part of a separate network device, herein referred to as flow detector system 112.

The flow detector system 112 includes a network interface 160, one or more processors 162 (e.g., central processing unit (CPU), graphical processing unit (GPU), and so forth), storage 164 (e.g., volatile and/or non-volatile memory), and a flow detector 166. The flow detector 11 may be designed to, among other functions, monitor and/or sample data traffic between the content server 106 and the user equipment 104 via data networks 108, 110, and 115, similar to the flow detector 166 of FIGS. 2A and 2B. The flow detector system 112 and the transport manager system 102$b$* of FIG. 1B may be linked to a data network 114, which in some embodiments, may be a Local Area Network or Software Defined Network such as a network or networks composed of directly interconnected hardware collections of routers, switches, gateways and the like. In some embodiments, the three data networks 108, 110, and 114 may be a single functional network.

In an embodiment, selective packet data flows may be identified for further processing by the flow detector system 112 based on configured policies or templates characterizing the data flows traversing the data networks 108, 110, and 114. For example, the flow detector system 112 may employ the flow detector 166 to measure the average throughput, delivered data volume, duration, and other characteristics of the data flow in order to classify the flow as an elephant flow, which is a relatively burdensome type of data flow due to its relatively large, disproportionate use of network resources including shared throughput capacity.

The specific flow types (e.g., elephant flows) of packets flowing through the data networks 108, 110, and 114 may be determined based on, for example, the component packet network and transport layer headers of the packets, which may include, for example, combinations of IP source and destination addresses, transport control protocol (TCP) or User Datagram Protocol (UDP) source and destination ports, protocols (e.g., IPv4), flow labels (e.g., IPv6), flags, extension header fields, and so forth. That is, different packets may be identified as belonging to the same data flow (or virtual flow) by, for example, processing the headers of the packets to determine that the packets have, for example, the same source and destination port, protocol, flow labels, extension header fields, and so forth. Once a data flow (i.e., packet data flow) has been identified, the amount of data being carried by the identified data flow may be ascertained in order to determine whether the data flow is an elephant flow.

In some embodiments, a data flow is identified as an elephant flow by sampling packets of an aggregate combination of one or more flows and selecting a flow that exceeds a threshold data rate measured within a defined sampling duration. In other embodiments, a data flow is identified as an elephant flow by sampling and selecting a flow that exceeds a continuous activity duration threshold which may be defined by measuring a number of consecutive data rates, or a sequence of data rates, each of which exceeds a threshold data rate. In still other embodiments, a data flow is identified as an elephant flow by randomly sampling only some of the packets of an aggregate combination of one or more flows and selecting a flow that exceeds a relative detection probability that indicates relatively disproportionate use of the aggregate traffic bandwidth. In still other embodiments, these methods may be used in combination or with other similar methods.

In some cases, when the network or transport layer packet data payloads are encrypted or obfuscated, the payload headers may be processed/examined in order to identify packets that belong to the same packet data flow. In other cases, where the packet data payloads are readable, the information in the network or transport packet payloads may be processed/examined to further help identify packets associated with a particular data flow or type of data flow (e.g. streaming video).

In some embodiments, once the flow detector system 112 has identified an elephant flow or another flow that may be burdensome, the flow detector system 112 may trigger reconfiguration of the packet forwarding logic in the data network 114 so that packets in the identified data flow are directed to pass through the transport manager system 102b* in the end to end path between the source (e.g., a content server 106) and the destination (e.g., 104). For example, the flow detector system 112 may communicate the characteristics of the burdensome flow to one or more routers and switches including the data network 114. Accordingly, dynamically configured forwarding or switching rules may be used to direct subsequent packets in the same data flow to pass through the transport manager system 102b* in the end-to-end path of the packets, for example, using the principles of Software Defined Networking. In other embodiments, however, the transport manager system 102b* may be included in the end-to-end path, according to default rules, and the flow detector system 112 may merely inform the transport manager system 102b* of detected flows that match one or more classification templates so that the detected flows are processed (e.g., pacing the flow rate to reduce the delivery rate of the flows) while other traffic flows may be forwarded without processing.

In some cases, a flow may be unidirectional (e.g., either an uplink or downlink flow) or may be bidirectional by being paired with a flow in the opposite direction (e.g., packets with interchanged destination and source network addresses, interchanged port addresses, common flow label, etc.) belonging to a communicating pair of connection endpoints. In some embodiments, both directions of a bidirectional flow pair may be directed to the transport manager system 102b*.

In some embodiments, the flow detector system 112 and the transport manager system 102b* may be distinct functional elements as shown in FIG. 1B, or combined into a single functional unit as illustrated in FIG. 1A.

Figure 3:
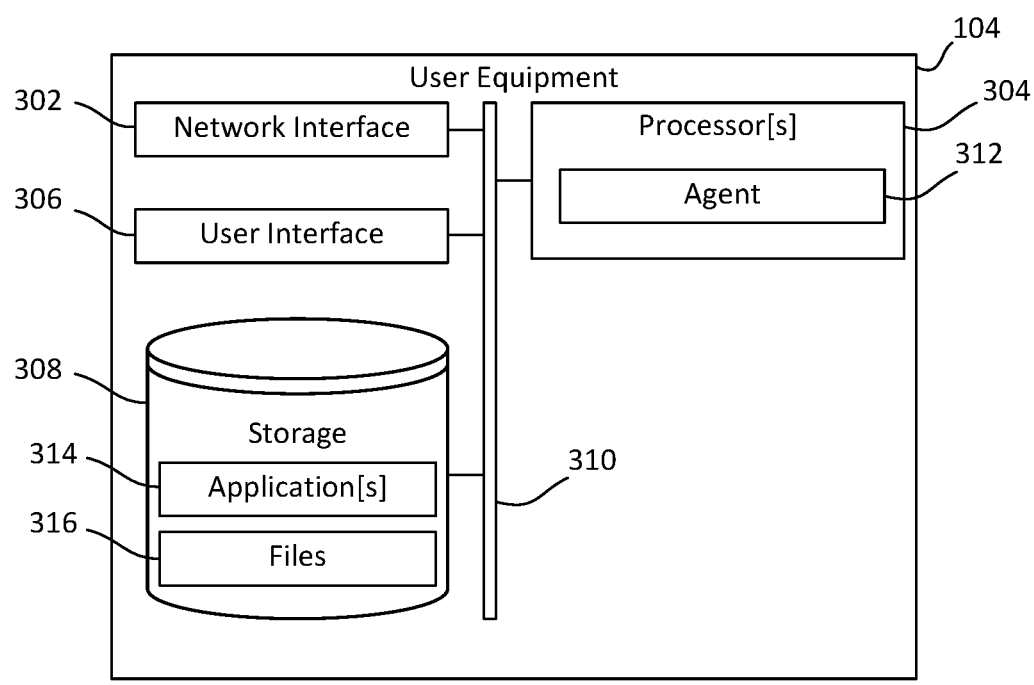
FIG. 3 is a block diagram of a user equipment according to an embodiment.

FIG. 3 is a block diagram of the user equipment 104 according to an embodiment. The user equipment 104, which in some cases, may be a mobile computing device or a desktop computer, may include a network interface 302 (e.g., a NIC), one or more processor 304, user interface 306 (e.g., including a display, speakers, keyboard, mouse, and so forth), and storage 308 (e.g., a volatile and/or non-volatile memory), that are coupled together via bus 310. The storage 308 may store one or more applications 314 and one or more files 316 (e.g., media content files such as audio and/or video files). In some embodiments, the one or more processors 304 may execute one or more computer readable instructions (e.g., an application 314) to implement an agent 312 that may be designed to facilitate the various functionalities performed by the transport manager system 102* of FIGS. 1A, 1B, 2A, 2B, 2C, and 2D.

Figure 4:
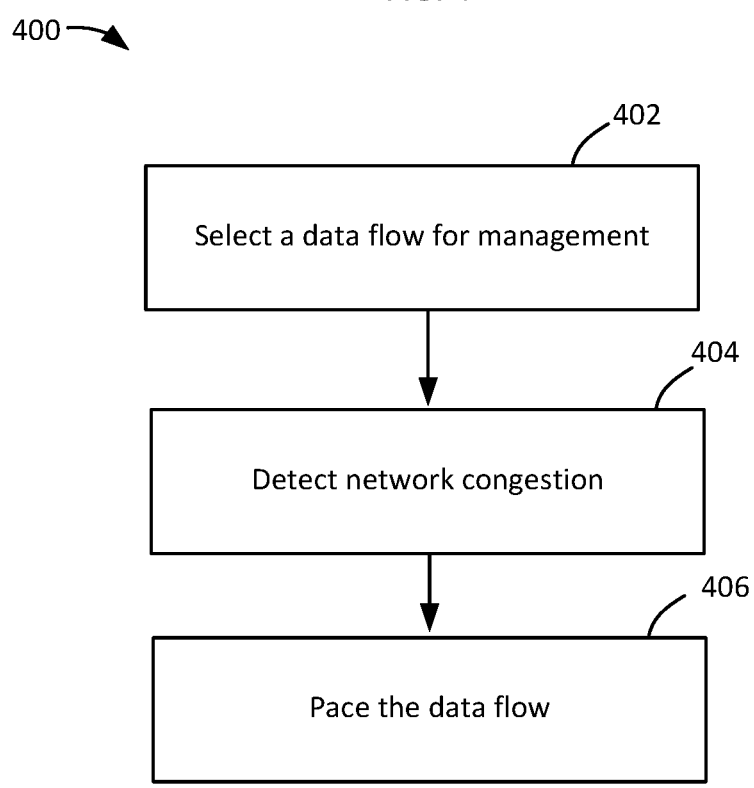
FIG. 4 is a high-level logic flow diagram of a process according to an embodiment.

FIG. 4 illustrates a process for selecting and managing a data flow according to an embodiment. In some implementations, the process 400 may be implemented by, for example, a flow manager 212* (see FIGS. 2A, 2B, 2C, and 2D) and a flow detector 166 (see FIGS. 1B, 2A, and 2B). The process 400 begins at 402 when a data flow is selected for management by, for example, a flow detector 166, from a plurality of data flows traversing through one or more data networks. The data flow that is selected may be transmitted from a source, such as the content server 106, to a destination, such as the user equipment 104. In some cases, the data flow may be selected based on a determination that that the data flow is an elephant flow (e.g., a data flow that consumes a portion of network bandwidth that is greater than a threshold level or that has a data rate that exceeds a threshold amount). In an embodiment, the data flow may additionally or alternatively be selected by determining the source for the data flow. For example, data flows that are determined to have originated form source addresses affiliated with specific content providers, such as video content providers, may be automatically selected for management.

At 404, network congestion is detected by, for example, the flow manager 212*. Various techniques may be employed in order to detect network congestion. For example, in some implementations, network congestion may be detected by determining the delivery performance of the selected data flow. This may be accomplished by allowing packets associated with the selected data flow to traverse through the network as fast as the network will permit in order to estimate a current delivery throughput for the selected data flow. In some embodiments, in order to accurately estimate the delivery throughput of the selected data flow, acknowledgements (e.g., ACK packets) that are transmitted by the destination (e.g., user equipment 104) in response to successfully receiving packets may be monitored. The network may then be determined to be congested if the estimated delivery throughput is less than the "peak throughput" for the selected data flow, which in some cases, may have been previously detected for the selected data flow. In an embodiment, a delivery throughput is an estimated amount of data that is delivered to a destination per unit of time while the peak throughput may be the highest (e.g., filtered, or averaged) estimated delivery throughput based on one or more prior such delivery throughput estimates for the selected data flow. In another embodiment, the peak throughput may be the highest (e.g., or filtered, or averaged) estimated delivery throughput for one or more prior such delivery throughput estimates for other data flows. In some embodiments, the highest estimated delivery throughput may have been estimated based on peak hold, percentile-based analysis, filtered data throughput, and/or averaged data throughput. In some cases, the peak throughput may be reported by the agent 312. In other cases, the peak throughput may be estimated by the flow manager 212*. In still other cases, the peak throughput may be estimated by other network elements.

That is, when a data flow for a media file is traversing through a network, the throughput of the data flow will frequently fluctuate depending on available network capacity/congestion. At points in time when there is spare network capacity (e.g., no congestion), the associated packets will be delivered to the destination (e.g., user equipment 104) at an optimal or maximum rate, which is referred to herein as the peak throughput. At a particular point in time when the data flow is detected as not being delivered to the destination at peak throughput levels, the network may be determined to be congested. In some embodiments, the detection of the network congestion may include determining the level of network congestion based, for example, on the determined delivery performance of the selected data flow.

At 406, based on the detected network congestion, the selected data flow is paced by, for example, the flow manager 212* in order to reduce the delivery rate of the data flow to the destination. In some embodiments, the delivery rate of the data flow may be reduced by adding latencies between the packets to be transmitted to the destination. For example, in order to slow the delivery rate, one or more latencies may be added between transmission of two or more packets of the data flow to be transmitted to the destination. The amounts of the one or more latencies to be added may be based, for example, on the determined delivery performance of the flow or the level of network congestion. In an embodiment, data associated with the data flow may be buffered in a queue (e.g., queue 306 of the transport manager system 102*). In an embodiment, a delivery rate may be defined as the amount of data sent by the transport system 102* for a flow in a time interval selected to achieve an average target data rate over the time interval. As used herein, the term "pace" or "paced" refers to a network operation where a target data rate is dynamically adjusted, i.e., increased or decreased, according to network conditions. In an embodiment, the target data rate is dynamically adjusted not to exceed the allocated TCP fair share. In an embodiment, a target data rate may be defined as a rate that decreases in proportion to the numerical difference between the current estimated throughput of the flow and the peak throughput. Because this numerical difference continually varies due to fluctuating network conditions the target data rate is also dynamically (e.g., continuously or frequently) adjusted.

Figure 5A:
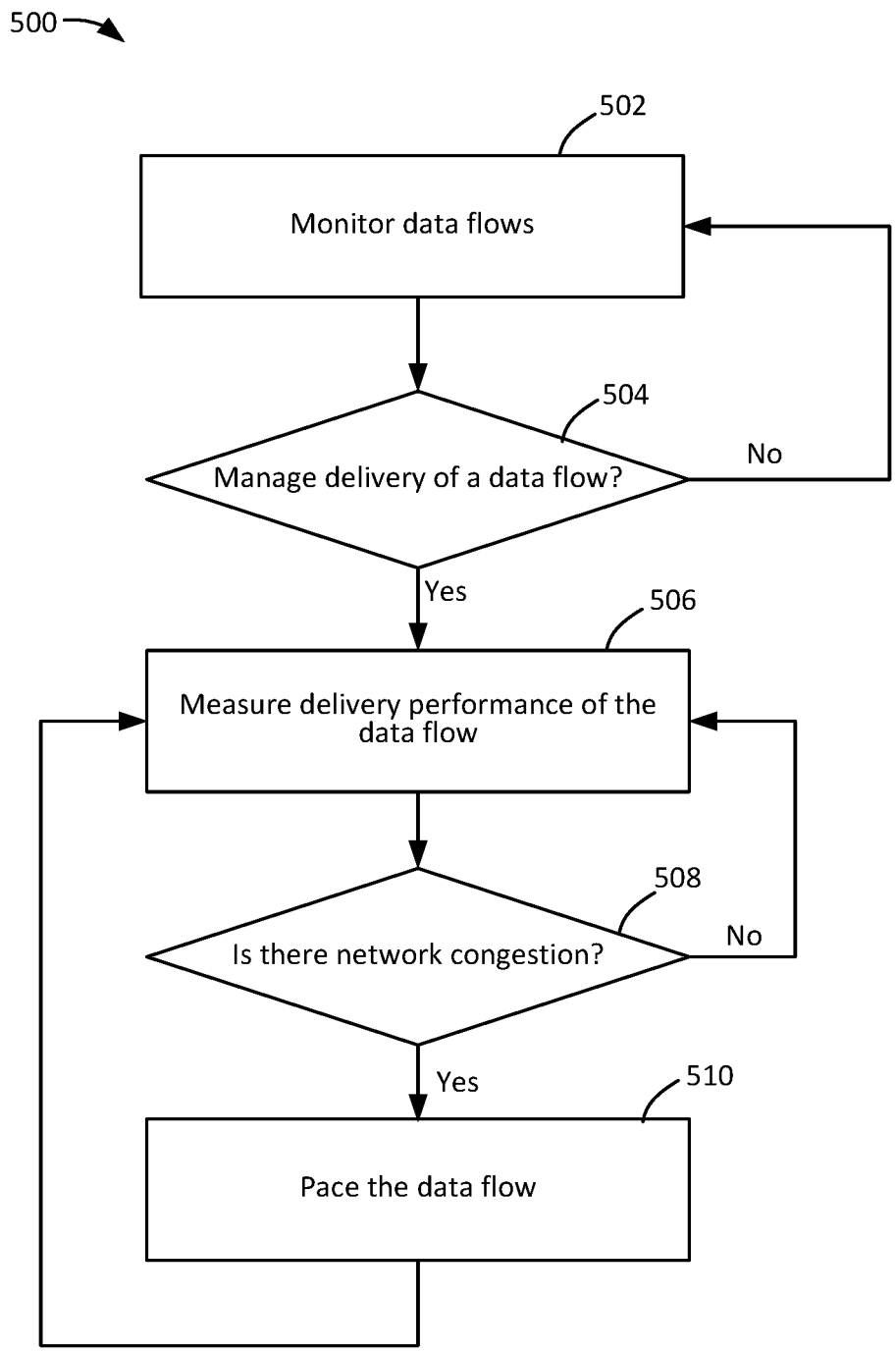
FIG. 5A is a high-level logic flow diagram of a process for selecting a data flow for management and for pacing the data flow according to an embodiment.

FIGS. 5A and 5B illustrate two processes 500 and 550 that are two different implementations of process 400 of FIG. 4 according to some embodiments. The processes 500 and 550 may be implemented by the flow manager 212* of FIG. 2A, 2B, 2C, or 2D and the flow detector 166 of FIG. 1B, 2A, or 2B.

In some cases, a single logical flow may be associated with two or more transport layer flows that have the user equipment 104 as an end point. Aggregate traffic from the single logical flow may be managed by, for example, the flow manager 212* according to the operations illustrated in FIG. 5A or 5B. For example, an application running on the user equipment 104 can create multiple transport control protocol/internet protocol (TCP/IP) flows that the application can use to send and receive data. By associating and managing the single logical flow that includes the traffic of the multiple TCP/IP flows, the operations illustrated in FIG. 5A or 5B can be performed on a per-user-equipment and/or per-user-app basis. In some embodiments each flow's TCP/IP 4-tuple (source address (SA), destination address (DA), source port (SP), destination port (DP)) and protocol ID, or (SA, DA, flow label) may be used to group flows sharing a common user equipment IP address, protocol ID, or combinations of these. In other embodiments, a unique ID of the user equipment 104 known to be associated with an IP address may be used to group multiple TCP/IP flows into a single logical flow.

FIG. 5A illustrates a process 500 for selecting a data flow for management and for pacing the data flow according to an embodiment. Process 500 may be implemented regardless of whether the network or transport layer payloads of the packets being managed are encrypted or not encrypted. Process 500 begins at 502 when data flows traversing through one or more networks are monitored by, for example, a flow detector 166. In some implementations, this may be accomplished by monitoring the network layer (e.g., IP) and the transport layer (e.g., TCP, UDP) flows (e.g., the TCP/IP portions of packets) that pass through the transport manager system 102* of FIG. 1A or 1B (or the flow detector system 112 of FIG. 1B). In some cases, the monitoring operation 502 may include inspection of higher layers (e.g., HTTP or application layer).

Based on a set of flow classification policies, the flow detector 166 may select a particular data flow for closer inspection and management at 504. For example, the flow detector 166 may determine that a flow satisfies the policy criteria of an elephant flow. In another example, assuming that TCP/IP is employed, the flow detector 166 may determine that the destination IP network addresses of multiple flow packets are associated with a major commercial provider of online video streaming content based on a handshake performed when a 3-way TCP connection is established. The returning TCP/IP 4-tuple (SA, DA, SP, DP) and protocol ID of the connection may be recorded so that the flow detector 166 can detect and inspect ingress (WAN to AN) packets that belong to the established TCP/IP flow.

In some cases, the connection network layer of interest may be tunneled within one or more encapsulating protocols of the packets being inspected, which may require the flow detector 166 to unwrap the one or more encapsulating protocols in order to inspect one of the source and destination, protocol, and acknowledgment network information. When not precluded by encryption, in some embodiments, the monitoring operation 502 may also include inspection of higher layers (e.g., HTTP or application layer).

At 504, the flow detector 166 may identify or select a data flow that is to be further processed and managed. When the flow detector 166 is located at the flow detector system 112 (see FIG. 1B), the flow detector 166 may direct the flow's packets (and associated return packet flow packets) to the transport manager system 102*. Alternatively, the flow detector 166 may signal the transport manager system 102* to begin managing the flow when traffic redirection is not required (e.g., the data flows already are being directed through the transport manager system 102*). If the flow detector 166 does not identify or select a data flow for further processing and management, the process 500 returns to 502.

At 506, delivery performance of the selected data flow is measured by, for example, a flow manager 212* of a transport manager system 102*. In some embodiments the flow manager 212* may measure the delivery performance by monitoring the delivery performance of the selected data flow during a measurement phase. In one embodiment of a measurement phase, a volume of data of a flow and the timing of the delivery of the volume of the data sent by the transport manager system 102* to the user equipment 104 may be used to determine the average delivery throughput.

In some embodiments, timing and delivery performance to the receiver (e.g., user equipment 104) of the selected data flow (which may be the data flow for a file segment) may be inferred when the flow manager 212* forwards one or more data packets. For example, the delivery performance (e.g., throughput) to the receiver of the data flow may be ascertained by counting the number of egress bytes sent to the receiver in a known time interval that may be sufficient to establish steady state conditions in the network (e.g., data network 108) connecting the transport manager system 102* and the receiver (e.g., user equipment 104). In these embodiments, bytes in the egress data packets may not be confirmed to be delivered to the receiver, which may introduce errors in the determined delivery performance, but these errors may remain small in many cases and may, therefore, be disregarded. This method may be used, for example, using transport or other protocol layers that do not support, or complicate, the detection by the flow manager 212* of return acknowledgement (ACK) packet information from the receiver of the flow (e.g., UDP).

In some embodiments, the phrase "steady state," as used herein, may be in reference to data flows and/or delivery rates that are achieved once an initial ramping period (e.g., the initial time interval when transmission of data packets of a flow ramps up) has passed. For example, during a measurement phase of a flow, the throughput of the flow might fluctuate (e.g. starting relatively slowly and then achieving a sustained average rate after some interval). If the measurement phase is not long enough or does not exclude, e.g., the initial ramping interval, then it may be insufficient to establish steady-state. Transmission of data packets through, for example mobile networks, will often not be able to reach steady state conditions after transmitting one or a few data packets. In fact, establishing steady state may actually take one or a few seconds, during which many data packets are sent, and lasting multiple round-trip-time (sender to receiver to sender) intervals. Thus, one way to define a steady state measurement may be defined as the flow measurement taken once a certain interval of time (e.g., ramp up time interval) has passed. Another way to define a measurement that has achieved steady state is one where the measurement time interval is increased to a sufficient level so that the measurement does not change significantly with additional measurements.

In some cases, the timing and delivery performance of the data packets in the selected data flow may be ascertained and/or confirmed by inspecting the returning ACK packets (e.g., TCP ACKs) transmitted by the receiver in response to receiving the transport layer (or other protocol layer) packets of the data flow that are received by the receiver. For example, in some embodiments, the flow manager 212* may begin the delivery performance measurement operation 506 by using the timing of the number of sent and acknowledged packets within a defined time interval or a fixed or threshold volume of sent and acknowledged data bytes. In some cases, received packet acknowledgment may involve inspection by the flow manager 212* of uplink tunneled and or higher/lower layer packet payloads or headers of the file segment packets (e.g., Physical, Data Link, Network, Transport, Session, Presentation or Application layer header or payloads).

In other embodiments, the delivery performance of data flows to one or more other receivers sharing the same network connecting to the transport manager system 102* can be used to infer the delivery performance between the transport manager system 102* and the subject receiver (e.g., user equipment 104). For example, the flow manager 212* may determine the delivery performance of data flow to a first receiver (e.g., a first user equipment), and if a second receiver (e.g., a second user equipment) is known to be operating on the same shared network (e.g., same serving base station radio link), the delivery performance for a concurrent flow to the second receiver may be inferred without needing to conduct a separate measurement operation on the second receiver's data flow. The flow manager 212* may determine that the first and second receivers share a base station, for example, based on network information linking the receiver's current IP or network address with the serving base station ID. This method may be used, for example for transport or other protocol layers that may make it difficult for the flow manager 212* to conduct an accurate separate measurement phase of the second receiver's flows (e.g., UDP).

By maintaining a record of the peak observed throughput performances of multiple data flows of a network, the flow manager 212* can detect flows with slower than peak throughput at 510 and may thereby infer network congestion, e.g., from competing traffic flows sharing a bottleneck network link.

This method of determining a steady-state network delivery performance of multiple data flows may depend on a measured delivered data volume that is of sufficient length to span delivery time intervals of many round-trips in order to achieve a stable estimate of the network's throughput capacity. When this is not possible, the flow manager 212* may, in some embodiments, use averaged or filtered values of the measured throughput to detect congestion.

For example, in some embodiments the peak observed throughput performance may be determined via statistical weighting of one or more measured values of multiple data flows such as determining percentiles, averages, weighted averages, moving averages, and the like. In other embodiments, the peak throughput may be determined based on known information regarding one or more of the network segments between the content source and destination of the traffic flows, e.g., the maximum throughput of one or more bottleneck network segments.

At 508, a determination is made as to whether there is network congestion. The flow manager 212* may make such a determination by comparing the current throughput of the selected data flow with the peak throughput. If the current throughput is equal to or greater than the peak throughput, the process 400 returns to 506 where the delivery performance of the data continues to be measured. If, on the other hand, the current throughput is less than the peak throughput, then the network is determined to be congested. After network congestion is detected at 508 then the flow manager 212* may, in some embodiments, enter a pacing mode of operation in which the identified data flow is dynamically paced at 510.

In some embodiments, the dynamically pacing of the selected data flow may be achieved by, for example, continuously or incrementally decreasing or increasing the delivery rate of the data packets being transmitted to the receiver. For example, the flow manager 212* may reduce the delivery rate of the selected data flow to the receiver by adding, for example, latencies between packets transmitted to the receiver at least until a target average throughput is achieved for the pacing interval. After the delivery rate of the data flow has been adjusted, process 500 may return to 506 where the delivery performance of the data flow is again measured.

In order to reduce the delivery rate of the selected data flow, in some embodiments, the incoming network-layer packets (e.g., IP) from the upstream content server 106 are enqueued (e.g., buffered) at the transport manager system 102* and then retransmitted through the packet network 108 (e.g., access network) according to a target rate policy. In some cases, the target rate policy may be a reciprocal function of the detected congestion (e.g. decreasing the target rate as congestion increases and increasing the target rate as congestion decreases). Under such a policy, pacing (e.g., slowing or reducing the delivery rate) may not be required if congestion is not detected or if the detected congestion is lower than some threshold. In some embodiments, depending on the level of congestion detected, the target rate is calculated so that the target rate throughput is lower than the rate that the network (e.g., packet network 108) was previously observed to be able to support when one or several file segments were delivered without added pacing latency.

In some embodiments, pacing may be implemented by delaying the sending of a unit of data (e.g., an IP packet) so that the average transmission rate is consistent with a target level. For instance, if the (access network) AN-facing (e.g. mobile network) egress interface of the transport manager system 102* physical interface throughput capacity is 100 Mbps, and each data packet size (e.g., TCP payload) is 1500 Bytes, then two enqueued packets can be sent back-to-back in $2*1500*8/100E6=240E-6$ s. If, for example, a target pacing rate of 600000 bps is desired then a delay can be inserted between transmitting the packet pairs of $39.76E-3$ s (or in some embodiments sending one 1500B packet every 20 ms on average). In some cases, standard algorithms for controlling delay to achieve a target transmission rate and burst characteristics may be employed (e.g., token-bucket rate limiting). In some embodiments, the additional inserted delay may be ramped from zero over several transport layer round trip time (RTT) periods in order to give the sending Transport Layer Protocol (e.g., TCP) a chance to adapt to the rate pacing more gradually.

In some embodiments, pacing may be performed considering the most recently delivered data that was transmitted to the destination (e.g., user equipment 104) without added pacing latency, so that the combined data delivered without and with pacing latency may be delivered at an average rate that achieves a transmission rate target level. It may be understood that the duration of the pacing interval, or the regulated throughput of the pacing interval, or both, may be varied in order to achieve the transmission rate target level.

In some embodiments the regulated throughput of the pacing interval may be constant, so that at least a minimum throughput for the paced flow continues to be delivered during the pacing interval, and then the variable pacing interval is calculated and set in order to achieve the transmission rate target level, taking into account the most recently delivered data that was transmitted without added pacing latency. In other embodiments, the length of the pacing interval may be constant and then the variable regulated pacing throughput is determined in order to achieve the transmission rate target level, taking into account the most recently delivered data that was transmitted without added pacing latency. In still other embodiments the regulated throughput of the pacing interval and the length of the pacing interval may both be variable and determined according to a policy. For example, setting a fixed regulated pacing throughput rate (e.g. constant throughput rate of 250 k bits/second) for the pacing interval and adjusting the time length of the pacing interval so long as the adjusted length (which may be calculated based on target average throughput rate) of the pacing interval does not exceed a threshold maximum (e.g., 5 seconds); otherwise the length of the pacing interval is set at the threshold maximum and the regulated pacing throughput is set (e.g., adjusted) to achieve the transmission rate target level.

In some embodiments, pacing of the identified data flow may be achieved by temporarily withholding and delaying at the transport manager system 102* content requests that are transmitted by the user equipment 104 to the content server 106. In this method of pacing, the flow manager 212* examines the content requests (e.g., HTTP GET) and may delay forwarding the requests to the content server 106 for a wait interval according to the current measured congestion level for the requesting user equipment 104.

In some embodiments, a packet queue discipline (e.g., first in first out—FIFO) may operate at the transport manager system 102* and a maximum allowed queue depth may be enforced to limit the maximum allowed queuing latency before packet loss occurs (e.g., ingress packets when queue is full may be discarded). In effect, in some embodiments of the pacing mode, the transport manager system 102* may operate similar to a network-layer packet router but whose egress interface throughput capacity is adjusted for a flow according to the congestion level in the downstream network bottleneck. In this manner, the transport manager system 102* may shift delivered traffic volumes into time intervals when congestion is not present or is reduced, and remove traffic from the data network 108 during congestion intervals. In some embodiments, the transport manager system 102* may use packet marking, e.g., Explicit Congestion Notification (ECN) of Network Layer packets (e.g., IP) to signal the sender of congestion rather than, or in addition to, packet drops or inserted latency.

In some embodiments of pacing mode, the delivery throughput of file segments may not reflect how fast the data network 108 could deliver packets if additional latency were not introduced between packet transmissions by the transport manager system 102*. Accordingly, to estimate the actual state of the downstream network congestion, the flow manager 212* may periodically allow one or more file segments to traverse the transport manager system 102* without adding pacing latency as will be further described herein.

FIG. 5B illustrates a process 550 for selecting a data flow for management and for pacing the data flow according to an embodiment. As previously indicated, process 550 may be implemented by the flow manager 212* of FIG. 2A, 2B, 2C, or 2D and the flow detector 166 of FIG. 1B, 2A, or 2B. In some embodiments, process 550 may be particularly applicable when network or transport layer payloads are not encrypted. As illustrated, process 550 includes operations that are the same or similar to some of the operations included in process 500 of FIG. 5A. For example, operations 552, 554, 558, and 560 of FIG. 5B substantially mirror operations 502 (e.g., monitoring data flows), 504 (determining whether to manage delivery of a data flow), 508 (e.g., determining whether there is network congestion), and 510 (e.g., pacing the data flow) of FIG. 5A.

Process 550 begins at 552 when the network layer (e.g., IP) and transport layer (e.g., TCP, UDP) flows (e.g., the TCP/IP portions of packets) that pass through the transport manager system 102* of FIG. 1A or 1B (or the flow detector system 112 of FIG. 1B) are monitored by, for example, a flow detector 166. In some cases, the monitoring of flows may include inspection of higher layers (e.g., HTTP or application layer) in order to determine, for example, a packet flow for a media content file being transmitted from a source (e.g., the content server 106) to a destination (e.g., the user equipment 104). The monitoring of flows may further involve measuring the volume of data being transmitted by a data flow, the data transmission rate of the data flow, and so forth.

At 554, the flow detector 166 may identify or select a data flow that is to be further processed and managed. When the flow detector 166 is located at a flow detector system 112 (see FIG. 1B), the flow detector 166 may direct the flow's packets (and associated return packet flow packets) to the transport manager system 102*. Alternatively, when traffic redirection is not required (e.g., the data flows already are being directed through the transport manager system 102*), the flow detector 166 may signal the transport manager system 102* to begin managing the flow. If no data flow is identified or selected for further processing and management, the process 550 returns to 552.

At 556, the flow manager 212* detects a file segment request (e.g., a request for a file download) from the destination (e.g., user equipment 104). For example, this may be accomplished directly by inspecting the application layer payload (e.g., HTTP GET), or indirectly by comparing heuristic data packet patterns (e.g., "fingerprints") of uplink and downlink packets, for instance, to known content server network addresses and transport layer ports combinations, protocol IDs, flow labels, and so forth, within definable time intervals, for fixed or threshold volumes of data bytes, or distinguishable combinations of these. By detecting a file segment request, the transport manager system 102* can ascertain that a file download is about to commence.

In some cases, (e.g., encrypted TCP payloads) reliable detection of a connection request can only occur sometime after download data has started flowing in response to a request (e.g., the volume or pattern of downlink data flowing confirms that a file request was made). Some embodiments may employ other methods of detecting that a file download is in progress.

At 558, a determination is made by, for example, the flow manager 212* as to whether there is network congestion. In an embodiment, the flow manager 212* may employ a variety of techniques to determine the congestion state of the data network 108 between the transport manager system 102* and the user equipment 104. In some cases, for example, the size of the file segment to be downloaded and the timing of the delivery of the file segment may be used to determine the average delivery throughput.

In some embodiments, timing and delivery performance to the receiver of the file segment may be inferred by the forwarding of one or more file segments by the flow manager 212*, e.g., as quickly as the network permits. In other embodiments the timing and delivery performance of the file segment may be additionally confirmed by inspecting the returning ACK packets (e.g., TCP ACK) corresponding to the transport layer (or other protocol layer) packets of the file segment sent by the transport manager system 102*. For example, in some embodiments the flow manager 212* may begin the congestion state determination by using the timing of the number of sent and acknowledged packets within a defined time interval or a fixed or threshold volume of sent and acknowledged data bytes. In some cases, received packet acknowledgment may involve inspection by the flow manager 212* of uplink tunneled and or higher/lower layer packet payloads or headers of the file segment packets (e.g., Physical, Data Link, Network, Transport, Session, Presentation, or Application layer payloads or layer headers).

By maintaining a record of the peak observed throughput performance during a particular data flow, the flow manager 212* can detect file segment transfers during the data flow with slower than peak throughput, and can thereby infer network congestion as a result of, for example, competing traffic flows sharing a bottleneck network link.

This method of determining network congestion may require the delivered file segment size to be of a sufficient length that spans delivery time intervals of many round-trip times in order to achieve a stable estimate of the network throughput capacity. When this is not the case the flow manager 212* may, in some embodiments, use averaged or filtered values of measured throughputs of multiple file segments to detect congestion.

For example, in some embodiments the peak observed throughput performance may be determined via statistics of one or more measured values such as percentiles, averages, weighted averages, moving averages, and the like. In some embodiments, the peak throughput may be determined based on known information regarding one or more of the network segments between the source and destination of the traffic flows, e.g., the maximum throughput of one or more bottleneck network segments. By comparing the current throughput with the peak throughput, a determination may be made to whether there is network congestion. If no network congestion is detected (e.g., the current throughput is equal to or substantially equal to the peak throughput) at 558, the process 550 returns to 556 to detect another file segment request. On the other hand, if network congestion is detected in 558, then the transport manager system 102* may, in some embodiments, enter a pacing mode of operation in which the identified or selected data flow is dynamically paced at 560.

As described previously, pacing of a data flow may involve continuously or incrementally adjusting downwards the delivery rate of the data flow. After the delivery rate of the data flow has been adjusted, process 550 may return to 556 in which another file segment request may be detected. This process (e.g., 556, 558, and 560) of detecting a file segment request, determining network congestion, and pacing the data flow may be repeated until the entire file has been downloaded to the destination.

Figure 6A:
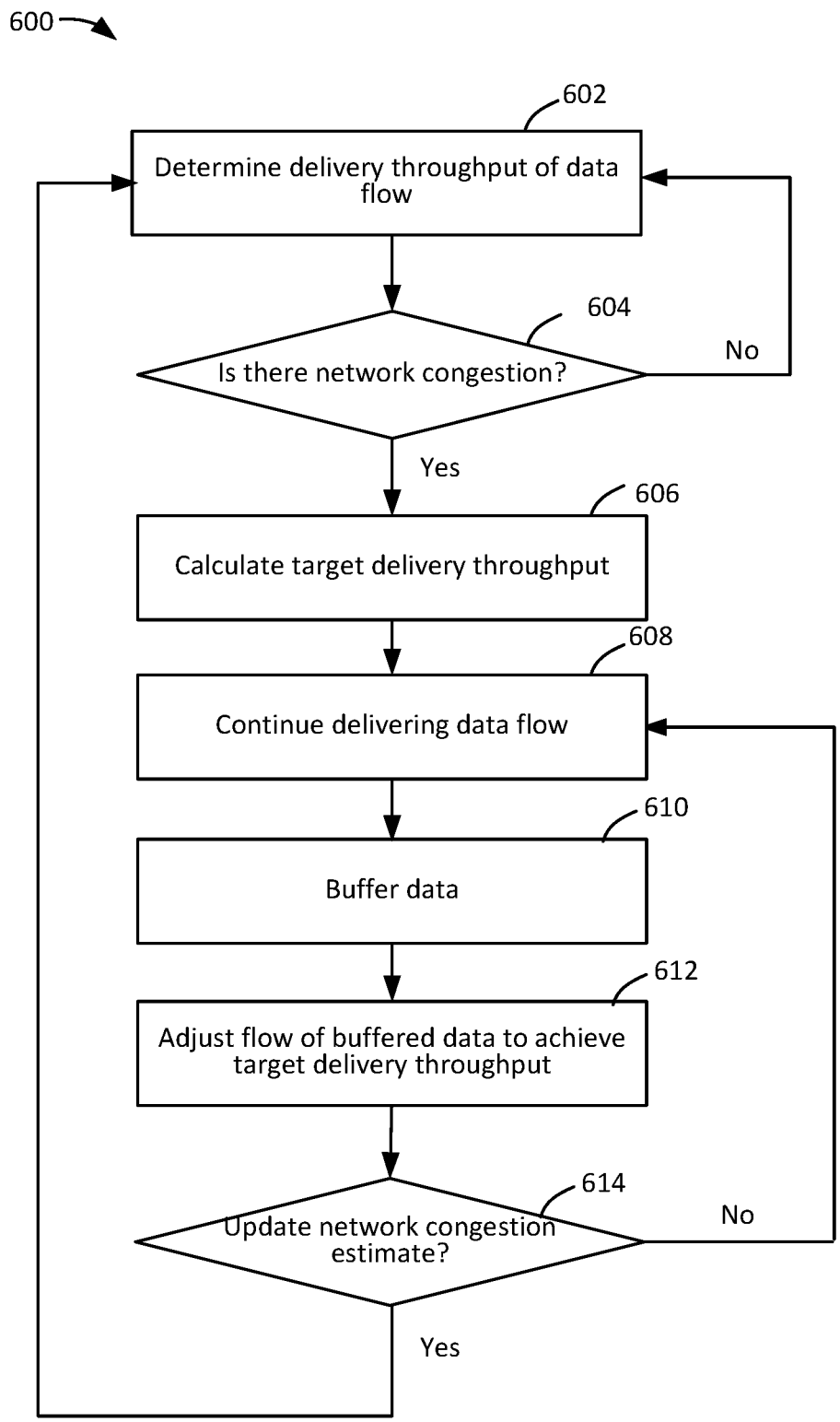
FIG. 6A is a high-level logic flow diagram of a process for managing the delivery throughput of a data flow according to an embodiment.

FIG. 6A illustrates a process for managing the delivery throughput of a data flow according to an embodiment. In some cases, process 600 may correspond generally to 506, 508, and 510 of FIG. 5A. In an embodiment, the process 600 may be implemented by the flow manager 212* of FIG. 2A, 2B, 2C, or 2D. Process 600 may be implemented even if the flow manager 212* of the transport manager system 102* is unable to monitor and inspect file segment delivery requests and corresponding responses from, for example, content servers (e.g., unable to read information contained within the application protocol layer).

Process 600 begins at 602 when the delivery throughput of a selected data flow (selected, for example, via operations 502 and 504 of FIG. 5A) is determined. As will be further described herein, the delivery throughput of the selected data flow may be determined using one or more available techniques for determining delivery throughput, such as counting, during a time interval, the number of data packets of the selected data flow that the transport manager system 102* is able to send to the user equipment 104 and that the access network (e.g., data network 108) permits. Other techniques may be employed in order to estimate the delivery throughput of the selected data flow in other embodiments.

At 604, a determination is made as to whether there is network congestion between the transport manager system 102* and the user equipment 104. In an embodiment, this may involve comparing the currently determined delivery throughput to the historic peak throughput for the selected data flow associated with the file segment being downloaded to the user equipment 104. If network congestion is not detected, the process 600 returns to 602, otherwise process 600 moves to 606. Note that specific details related to 602 and 604 will be provided below with reference to process 650 of FIG. 6B.

At 606, a target delivery throughput is calculated based on the level of network congestion determined at 604. In an embodiment, the estimated target delivery throughput is a smaller throughput than the peak throughput for the selected data flow. And in most cases, the target delivery throughput is smaller than the throughput determined at 602. In an embodiment, the target delivery throughput may be calculated based, at least in part, on the determined level of network congestion.

At 608, the delivery of the selected data flow to the destination (e.g., user equipment 104) is resumed by delivering the selected data flow to the destination using a delivery throughput rate that matches the calculated target delivery throughput rate. The delivery of the selected data flow may continue at least until the data flow is discontinued (e.g., when there is no more data to deliver), which, in some cases, may be based on a timeout after data delivery pauses or on observing a flow connection tear-down (e.g., TCP 4-way handshake), connection reset, flow activity timeout, or similar indication that the flow is no longer active.

At 610, data from the selected data flow received by the transport manager system 102* is buffered (e.g., queued) in, for example, the queue 206 of the transport manager system 102*.

At 612, the delivery of the selected data flow to the destination is paced by adjusting the flow of the buffered data stored at the transport manager system 102* to the destination (e.g., user equipment 104) to achieve the target delivery throughput.

At 614, a determination is made as to whether the network congestion estimate (as estimated in 604) needs to be updated. If no such update is needed, then the process 600 returns to 608. On the other hand, if the network congestion estimate needs to be updated, then process 600 returns to 602. By returning to 602 a determination may be made as to a new or updated network congestion level, which may then be used in order to adjust the delivery rate of the data flow to the destination.

That is, in some embodiments, the process 600 may periodically (e.g., every Nth delivered file segment, after a predetermined time interval or intervals, or after a threshold amount of data is delivered) trigger an update of (e.g., sampling of un-paced packets to determine) the congestion state of the data network 108 between the transport manager system 102* and the destination by causing an exit from the pacing mode delivery of the selected data flow, and looping back to the beginning of the process 600.

In some embodiments, conditions that may influence whether an update to the estimated network congestion is needed include, for example, whether other connections from other user equipment terminals in communication with the transport manager system 102* have recently reported on the congestion state of the same data network 108 or a bottleneck throughput portion thereof. However, embodiments may use other conditions to influence whether an update is needed.

Figure 6B:
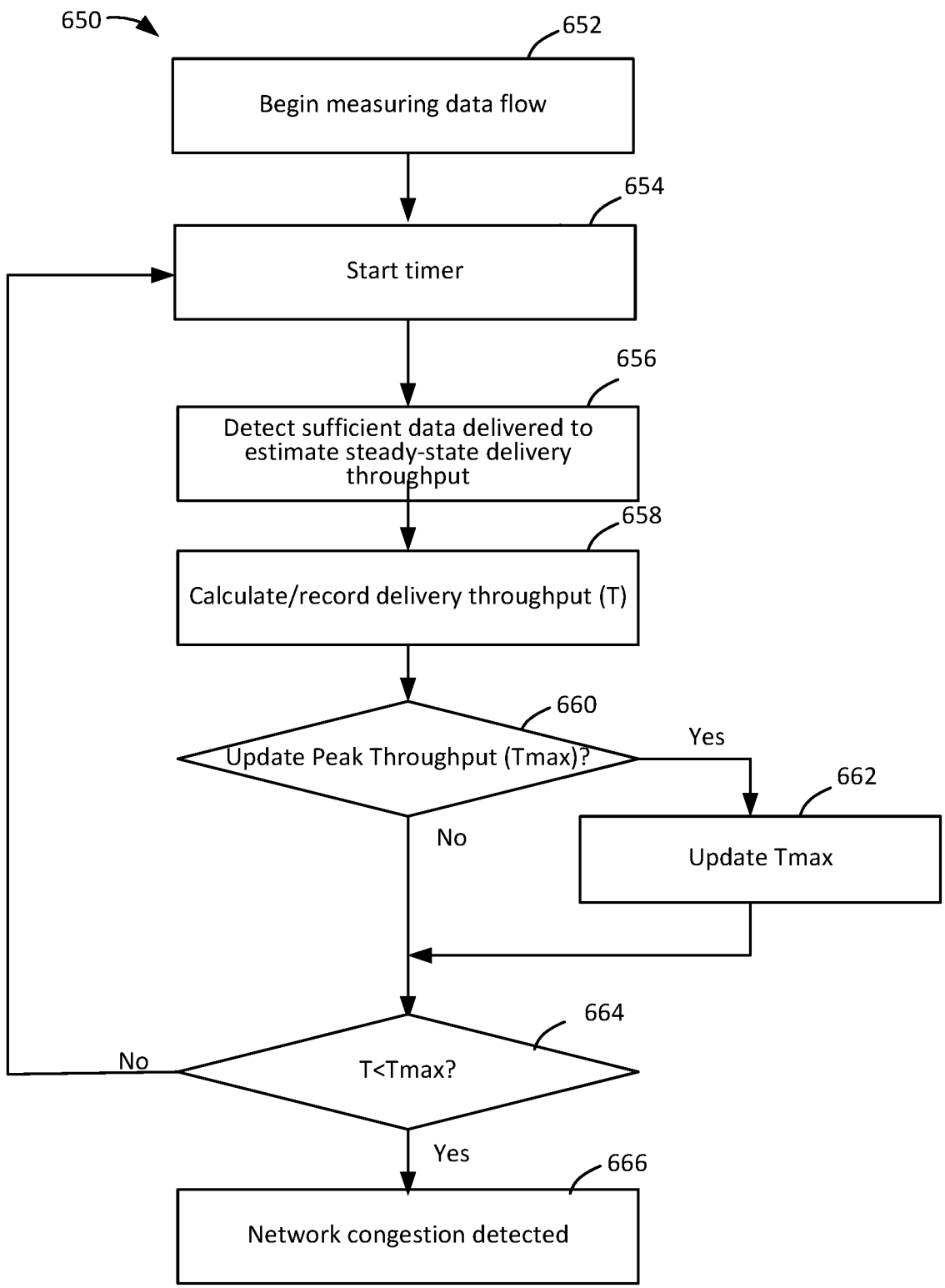
FIG. 6B is a high-level logic flow diagram of a process for determining delivery throughput of a selected data flow and determining whether there is network congestion according to an embodiment.

Referring to FIG. 6B, which illustrates a process 650 for determining delivery throughput of a selected data flow and determining whether there is network congestion according to an embodiment. Process 650 generally corresponds to operations 602 and 604 of FIG. 6A. In some embodiments, process 650 may be implemented by the transport manager 102* of FIG. 2A, 2B, 2C, or 2D. Process 650 begins when a selected data flow (as selected, for example, by operations 502 and 504 of FIG. 5A) is measured at 652. In some embodiments, the measurement of the selected data flow may involve counting the packets associated with the selected data flow that are sent by the transport manager system 102* to the user equipment 104.

At 654, a timer is started. Once the timer starts, the transport manager system 102* (and more particularly, the flow manager 212*) continues to count the packets associated with the selected data flow that are being sent by the transport manager system 102*. The counting may continue at least until sufficient data has been sent and/or delivered to achieve a reliable steady-state estimate of the downstream network delivery throughput. This determination may be based on elapsed time, delivery rate, number of Transport Layer ACK cycles, volume of delivered data, and so forth, or any combinations thereof.

At 658, the current delivery throughput is calculated and recorded. In an embodiment, the calculation may be based on the data flow measurements made at 656.

At 660, a determination is made as to whether the peak throughput for the selected data flow should be updated. Note that a peak throughput in some cases will be associated with a specific data flow. For example, when a data flow associated with a media content file is being downloaded to the user equipment 104, the delivery throughput of the data flow may swing wildly depending on network congestion and other network conditions (e.g., signal-to-noise ratio or SNR, network node locations, signal strengths, and so forth). The throughput of the data flow will swing from a peak throughput that may correspond to the situation where there is no network congestion to a much lower throughput when, for example, the network is substantially congested. Thus, the peak throughput may need to be updated at any given point in time if a new peak is detected while the data flow is being delivered to the destination.

If a determination is made that the peak throughput for the selected data flow needs to be updated, then the peak throughput is updated at 662. On the other hand, if no update is needed, then process 650 moves to 664 where a determination is made as to whether there is network congestion. In an embodiment, network congestion may be identified when the calculated throughput falls below the peak throughput (which, again, may be continuously or periodically reset to avoid stale estimates of the network delivery capability in non-congested operation).

If no network congestion is detected, then process 650 returns to 654 at least until the data flow is discontinued (e.g., no more data to deliver). On the other hand, if network congestion is detected, then a determination is made by the transport manager system 102* (and more particularly, the flow manager 212*) that the data network 108 between the transport manager system 102* and the user equipment 104 is, in fact, congested.

During the measurement phase of process 650 (e.g., operations 652, 654, and 656), the monitored or sampled data flow may or may not be continuous. There may be situations in which the content server 106 and/or user equipment 104 have caused an interruption in the selected data flow. For example, a media player application might fill its runtime playback buffer and temporarily pause its requests for data from a video streaming server. In such a scenario, the measurement phase could determine an artificially low estimate of the network delivery performance for the data flow. Accordingly, a measurement phase may be preceded by a ramp-up phase (e.g., as part of 602) to ensure the data flow is active before proceeding with the measurement. The ramp-up phase in some embodiments may persist until a threshold volume of data, threshold activity time, or a combination of these or similar criteria for the flow are reached. The ramp-up phase may be re-entered whenever inactivity for the data flow is detected.

FIG. 7A illustrates a process for managing the delivery throughput of a data flow according to an embodiment. In some cases, process 700 may generally correspond to 556, 558, and 560 of FIG. 5B. In an embodiment, the process 600 may be implemented by the flow manager 212* of FIG. 2A, 2B, 2C, or 2D. In some cases, process 700 may be particularly useful when the flow manager 212* of the transport manager system 102* is able to detect and inspect file segment delivery requests and corresponding responses from, for example, content servers (e.g., able to read unencrypted information contained within the application protocol layer).

Process 700 begins at 702 when the delivery throughput for a file segment that is being delivered to the destination (e.g., user equipment 104) and that is associated with a selected data flow (as selected, for example, via operations 552 and 554 of FIG. 5B) is determined. In some embodiments, the file segment is being relayed to the user equipment 104 via the transport manager system 102* in response to a file segment request (e.g., an HTTP Byte-Range Request) that is sent from the user equipment 104 to the content server 106. The file segment request may be detected by the transport manager system 102*. The ensuing delivery of the file segment (without pacing intervention) can be used to probe the downstream network throughput as it passes through the transport manager system 102* using a process as illustrated, for example, in FIG. 7B.

At 704, a determination is made as to whether there is network congestion between the transport manager system 102* and the user equipment 104. In an embodiment, this may involve comparing the currently determined delivery throughput to the historic peak throughput for the selected data flow associated with the file segment being downloaded to the user equipment 104. If no network congestion is detected, the process 700 returns to 702, otherwise process 7600 moves to 706. Note that specific details related to 702 and 704 will be provided below with reference to process 750 of FIG. 7B.

At 706, a target delivery throughput is calculated based on the level of network congestion determined at 704. In an embodiment, the estimated target delivery throughput will be a smaller throughput than the peak throughput for the selected data flow. And in most cases, the target delivery throughput will be smaller than the throughput determined at 702. In an embodiment, the target delivery throughput may be calculated based, at least in part, on the determined level of network congestion.

At 708, a file segment request associated with the selected data flow and that is sent by the user equipment 104 is detected.

At 710, data associated with the requested file segment and that is received by the transport manager system 102* is buffered (e.g., queued) in, for example, the queue 206 of the transport manager system 102*.

At 712, the delivery to the destination (e.g., user equipment 104) of the data associated with the requested file segment is paced by adjusting the flow of the buffered data stored at the transport manager system 102* to achieve the target delivery throughput.

At 714, a determination is made as to whether the network congestion estimate needs to be updated. If no such update is needed, then the process 700 returns to 708. In some cases, the file segment request that may have originally been detected in 708 may be for the entire file, in which case, process 700 loops back to 710 to continue delivery of the file when a congestion update is not required (e.g., operations 702 and 704 are not needed). On the other hand, if the network congestion estimate needs to be updated, then process 700 returns to 702. By returning to 702 a determination may be made as to a new or updated network congestion level, which may then be used in order to adjust the delivery rate of the data flow to the destination.

As described with respect to 714 of FIG. 7A, various factors may be considered when determining when to update the network congestion estimate. For example, the network congestion estimate may be updated, in some cases, periodically (e.g., every Nth delivered file segment, after a predetermined time interval or intervals, or after a threshold amount of data is delivered).

In some embodiments, conditions that may influence whether an update to the estimated network congestion is needed include, for example, whether other connections from other user equipment terminals in communication with the transport manager system 102* have recently reported on the congestion state of the same data network 108 or a bottleneck throughput portion thereof. However, embodiments may use other conditions to influence whether an update is needed.

FIG. 7B illustrates a process 750 for determining delivery throughput of a file segment associated with a selected data flow and for determining whether there is network congestion according to an embodiment. Process 750 generally corresponds to operations 702 and 704 of FIG. 7A. In some embodiments, process 750 may be implemented by the transport manager 102* of FIG. 2A, 2B, 2C, or 2D. Process 750 begins when a file segment request (e.g., an HTTP Byte-Range Request) associated with a selected data flow (a data flow as selected, for example, by operations 552 and 554 of FIG. 5B) is detected at 752.

At 754, a timer is started. Once the timer starts, the transport manager system 102* (and in particular, the flow manager 212*) may monitor the selected data flow until the transport manager system 102* detects at 756 a subsequent file segment request transmitted by the destination (e.g., user equipment 104). In some embodiments, the monitoring of the selected data flow may involve, for example, monitoring for returning ACK packets transmitted by the destination (e.g., user equipment 104) upon successful delivery/reception of file segment packets from the transport manager system 102*

At 758, the throughput for the requested file segment is calculated and recorded. In some cases, the throughput may be calculated by ascertaining the amount of data associated with the requested file segment that was delivered to the user equipment 104 during a time interval between the start of the timer and when the subsequent file segment request was detected at 756. By dividing the delivered amount of data with the time interval, a throughput may be calculated.

In some embodiments, if the transport manager system 102* can identify the start packet and end packet of the file segment response, then by determining the amount of time that elapses between reception of the start packet and end packet can alternatively be used (e.g., file_segment_size/time_interval) to directly measure the downstream throughput of the file segment, without needing to reference the timing of the file segment request commands. Similar methods to partition the delivery into file segments may be used in scenarios where only a single file request for the entire file may occur.

At 760, a determination is made as to whether the peak throughput for the selected data flow should be updated. Note that a peak throughput in some cases will be associated with a specific data flow. For example, when a data flow associated with a media content file is being downloaded to the user equipment 104, the delivery throughput of the data flow may swing wildly depending on network congestion and other network conditions (e.g., signal-to-noise ratio or SNR, network node locations, signal strengths, and so forth). The throughput of the data flow will swing from a peak throughput that may correspond to the situation where there is no network congestion to a much lower throughput when, for example, the network is substantially congested. Thus, the peak throughput may need to be updated at any given point in time if a new peak is detected while the data flow is being delivered to the destination.

If a determination is made that the peak throughput for the selected data flow needs to be updated, then the peak throughput is updated at 762. On the other hand, if no update is needed, then process 750 moves to 764 where a determination is made as to whether there is network congestion. In an embodiment, network congestion may be identified when the calculated throughput falls below the peak throughput (which, again, may be continuously or periodically reset to avoid stale estimates of the network delivery capability in non-congested operation).

If network congestion is not detected, then process 750 returns to 754 at least until the data flow is discontinued (e.g., no more data to deliver). On the other hand, if network congestion is detected, then a determination is made by the transport manager system 102* (and more particularly, the flow manager 212*) that the data network 108 between the transport manager system 102* and the user equipment 104 is, in fact, congested.

In some embodiments the congestion determination may be impacted by network type, network attachment information (e.g., base station ID, cell ID) if such information is available to the transport manager system 102*.

In some embodiments, the transport manager system 102* may use alternative methods of detecting congestion such as calculating the downstream round trip time (RTT) of Transport Layer segments/ACKs and observing rates of change of the RTT (e.g., increasing when congestion increases). The RTT and ACK processing may be implemented using protocol layers other than the Transport Layer (e.g., TCP or UDP).

In some cases, the requested file segment that is to be delivered to the user equipment 104 has a sufficiently large data size that enables a stable steady-state estimate of the downstream network delivery throughput at 758. This determination may be based on total elapsed time, number of sequential sender/receiver Transport-Layer ACK cycles, volume of delivered data, or similar criteria. However, this requirement may not be necessary in other cases.

In some instances, steady-state may only be achieved after the transport layer protocol congestion-control state machine has sent many data packets. In general, a single Transport-Layer segment or few segments may not be sufficient. Depending on the delivery session protocol, a single file segment response may be sufficient or multiple sequential request/response cycles may be needed, in which the response delivery throughput measurements may be averaged or filtered. For example, in modern streaming media protocols, a file request is often made for an encoded video "chunk" of data (e.g., 128 kBytes) which is often, but not always, large enough to allow a stable estimate of the network steady state throughput capacity.

Once steady state is established, the measured throughput may be calculated at 758 and the peak throughput estimate may be updated, if needed, at 762.

If downstream network congestion is detected at 764 and 766, then the transport manager system 102* may operate with respect to the selected data flow in pace mode (e.g., operations 710 and 712 illustrated in FIG. 7A).

As briefly described above, in some embodiments, the user equipment 104 may employ an agent 312. The agent 312 may be a software agent that is implemented by one or more processors 304 (or other types of programmable circuitry) executing one or more machine readable instructions. In another embodiment, the agent 312 may reside at other network elements (e.g., base station, base station controller, and so forth) that may be associated with the access network (e.g., the data network 108) interfacing the user equipment 104.

In some embodiments, the agent 312 may assist the transport manager system 102* with certain operations and tasks such as terminal identification (e.g., user equipment identification) and network state reporting. Additionally, the agent 312 may assist the transport manager system 102* with other operations and tasks.

Figure 8:
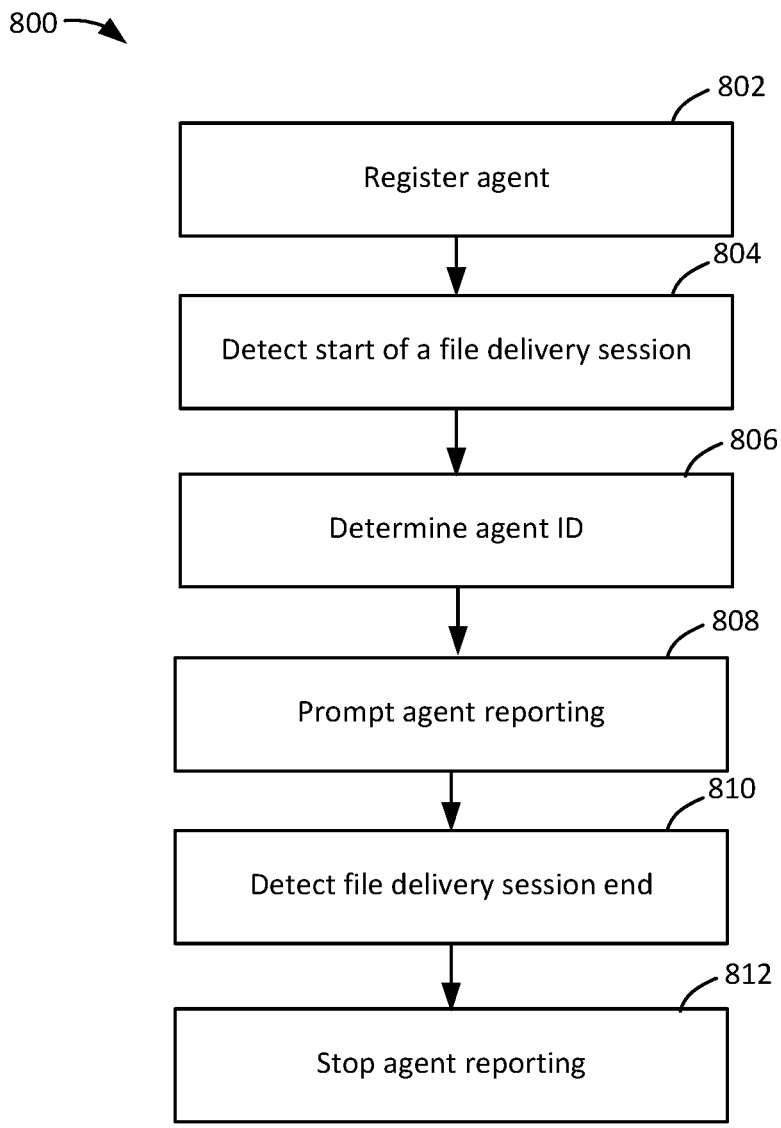
FIG. 8 is a high-level logic flow diagram of a process for interacting with an agent according to an embodiment.

FIG. 8 illustrates a process for interacting with an agent according to an embodiment. In some embodiments, the process 800 may be implemented by a transport manager system 102*.

Process 800 begins when the transport manager system 102* registers an agent 312. Registration of the agent 312 may be based on an agent unique identifier (UI) (e.g., an international mobile station equipment identity (IMEI) of the agent) and a current network data address (e.g., IP) of the corresponding user equipment associated with the agent, in order to assist with discovery of data flows (that may exist, e.g., between the user equipment 104 and remote content servers). Registration may also allow setup of a control data connection between the user equipment 104 and the transport manager system 102*, thereby facilitating "push" message capability. Registration may be repeated whenever the user equipment 104 comes online, changes its network data address, changes serving network type, and so forth.

At 804, the transport manager system 102* (or the flow detector system 112) may detect the start of an unknown file delivery session. During registration, the agent and the transport manager system 102* may exchange certain information such as the IP address of the user equipment 104 associated with the agent 312.

At 806, the identity of the agent 312 associated with the unknown file delivery session is determined by inspecting the packets of the file delivery session. For example, the user equipment 104 (which may be further associated with a particular agent 312) associated with the delivery of the unknown file may be detected, in some cases, by inspecting application payloads of TCP/IP packets (e.g., that are identified with the IP address of the user equipment 104 as reported by the agent 312 during registration).

At 808, the transport manager system 102* may signal the user equipment 104 to prompt the agent 312 to begin reporting information that may be useful to the transport manager system 102* in managing data flows to the user equipment 104. In some embodiments, the information that may be reported includes one or more of the current radio link quality (e.g., in terms of maximum throughput capacity) that may be periodically determined and reported, current network type (e.g., Third Generation (3G), High Speed Packet Access (HSPA), Long Term Evolution (LTE), Wireless Fidelity (Wi-Fi), and so forth), current attachment location (e.g., Bay Station Identification (BSID), Cell ID, latitude/longitude, Global Positioning System (GPS), Service Set Identification (SSID), and so forth), current serving operator (e.g., "XYZ Wireless"), user device resource status (e.g., low-battery, mobility status, processor status), user device application status (e.g., "Media Player Application XYZ active"), and so forth.

At 810, the transport manager system 102* may detect the end of the file delivery session. At 812, the transport manager system 102*, after detecting the end of the file delivery session, may signal the user equipment 104 to discontinue reporting. In some embodiments, the agent 312 may independently cease reporting (based on, e.g., changes to network type, low-battery, no active data sessions, entering airplane mode, and so forth).

In some embodiments the agent 312 may additionally or alternatively conduct its own assessment of the throughput capacity of the network (e.g., between the associated user equipment 104 and a remote data delivery source, or for a base station serving a collection of user equipment terminals) which could also be reported to the transport manager system 102*. In such scenarios, the transport manager system 102* may use the reports from the agent 312 to determine congestion in place of, or in addition to, its own assessment of network congestion.

In some embodiments, it may be possible to split the transport layer connection path between the sender (e.g., the content server 106) and receiver (e.g., user equipment 104) into two paths at the transport manager system 102*. In the default single-path version, pacing by the transport manager system 102* may alter the timing of the transport layer segments (RTT variation) as a control mechanism intended to modulate the rate of the affected traffic. Some transport congestion control algorithms (e.g., TCP congestion avoidance) may respond inefficiently to large step changes in the end-to-end RTT. Splitting the path into two separate paths with independent transport layer state machines may be one way to perform pacing without interfering with the TCP congestion control algorithm, while still allowing a transport manager system 102* to modulate the end-to-end throughput rate of separate transport layer connections.

In some situations, the transport manager system 102* may not be able to reliably detect packet reception ACKs (e.g., unacknowledged UDP with encrypted payloads) coming from the receiver of the flow. This may complicate the determination of network congestion and delivery performance of traffic flows by the transport manager system 102*. In these situations, the transport manager system 102* may be designed to operate so as to cause the destination (e.g., user equipment 104) to transmit ACK packets in a flow in one of several ways.

For instance, the transport manager system 102* may, in some embodiments, inject additional transport layer (e.g., TCP) packets, after each one or more UDP packets sent in a transport layer flow, in order that the agent 312 that receives such packets would acknowledge the inserted TCP packets. The injected TCP packets may be directed to the agent 312 rather than the UDP packet destination application on the same user equipment 104. The successful reception of the one or more UDP packets by the user equipment 104 may then be inferred by the transport manager system 102* upon receiving the corresponding TCP ACKs. In other embodiments, the transport manager system 102* may set flags or insert extension fields in the headers or payloads of the unacknowledged transport flow packets (e.g., UDP), or another protocol layer, which cause the receiving user equipment 104 or application 314 to acknowledge receiving the transport flow packet or which indicate that the transport flow packet has been received.

In other situations (e.g., UDP or TCP), the transport manager system 102* may operate in a mode that does not require detecting packet reception ACKs from the receiver of the flow, or require agents 312.

Although the methods and examples described above are generally related to content data flowing in the direction from a remote server (e.g., the content server 106) to the user equipment 104, the above described methods and systems could equally be applied in the reverse direction, delivering content data from terminal user equipment 104 to a remote server, without altering the primary details of the methods and systems described above.

Although aspects of the present technology have been described with respect to specific examples, embodiments of the present technology are not limited by these examples. For example, persons of skill in the art will recognize that downloading of data by conditionally using idle network capacity may be performed according to various other algorithms and processes without departing from the scope or spirit of the present technology.

What is claimed is:

1. A method comprising:
examining a first data packet transmitted to a first network equipment from a second network equipment, the first network equipment and the second network equipment being remotely located from each other and linked by at least one network, the first network equipment including a mobile device, the second network equipment including a transport manager system that monitors a plurality of mobile devices;

determining a data flow type of the first data packet, the data flow type including a first type of data flow and a second type of data flow;

if the data flow type is determined to be the first type of data flow, determining a delivery throughput of the first data packet to the first network equipment over a data flow path including a wireless link, the data flow path having a plurality of network nodes, the delivery performance relating to a data transfer rate to the first network equipment from the second network equipment over the data flow path;

selecting a mobile device from the plurality of mobile devices;

observing the selected mobile device to obtain a network connection state of the selected mobile device;

comparing the determined delivery performance of the first data packet to an expected peak data throughput capacity for a data packet transmitted to the first network equipment from the second network equipment, the expected peak data throughput being based on the network connection state obtained from the selected mobile device; and pacing transmission of data packets to the first network equipment if the comparison of the determined delivery performance and the expected peak data throughput capacity indicates existence of a congestion over the data flow path between the first network equipment and the second network equipment.

2. The method of claim 1, wherein the first type of data flow is a data flow that persists for longer than a threshold amount of time.

3. The method of claim 1, wherein the first type of data flow is a data flow that consumes a greater portion of network bandwidth than a threshold level.

4. The method of claim 1, wherein the first type of data flow is a data flow that has a data rate that exceeds a threshold amount.

5. The method of claim 1, wherein the first data packet is determined to be the data flow of the first type is based on a source of the first data packet.

6. The method of claim 1, wherein the second network equipment is a content server, and wherein if the data flow type is determined to be the first type of data flow, the first data packet is allowed to be transmitted to the first network equipment without performing the comparing or the pacing step.

7. The method of claim 1, wherein the expected peak data throughput capacity is set using one or more acknowledgment (ACK) packets that are transmitted by the user equipment in response to receiving one or more data packets from the second network equipment.

8. The method of claim 1, wherein the expected peak data throughput capacity is a reference throughput that was determined based on a data packet that was delivered to the first network equipment from the second network equipment at an earlier time.

9. The method of claim 8, further comprising:

updating the reference throughput with the delivery performance of the first data packet if the delivery performance of the first data packet is greater than the reference throughput;

wherein the updated reference throughput is used as the expected peak data throughput capacity in the comparing step subsequently.

10. The method of claim 1, wherein the report provided by the selected mobile device includes information on radio link quality.

11. The method of claim 1, wherein the report provided by the selected mobile device includes information a wireless network type, Wireless Fidelity, wireless operator, Base Station ID (BSID), Service Set Identification (SSID), or a combination thereof.

12. The method of claim 1, wherein the first type of data flow is a data packet including data for a media file, and wherein the first data packet and the data packets that are paced include data for the same media file.

13. The method of claim 1, wherein the first data packet and the data packets that are paced include data for the same media file.

14. A transport manager system, comprising:

one or more processors, a network interface, a queue, and a storage communicatively coupled with each other, the storage storing computer executable instructions that, when executed by the one or more processors, cause the transport manager system to:

examining a first data packet transmitted to a user equipment from a content provider;

determining a data flow type of the first data packet, the data flow type including a first type of data flow and a second type of data flow;

if the data flow type is determined to be the first type of data flow, determining a delivery performance of the first data packet to the user equipment over a data flow path, the data flow path having a plurality of network nodes, the delivery performance relating to a data transfer rate to the user equipment from the content provider over the data flow path;

comparing the determined delivery performance of the first data packet to an expected delivery performance for a data packet transmitted to the user equipment from the content provider; and pacing transmission of data packets to the user equipment if the comparison of the determined delivery performance and the expected delivery performance indicates a congestion exists over the data flow path between the user equipment and the content provider, wherein the expected delivery performance is based on a reference throughput that was determined based on a data packet that was delivered to the user equipment from the content provider at an earlier time, wherein the computer executable instructions, when executed by the one or more processors, cause the transport manager system to update the expected delivery performance if the determined delivery performance of the first data packet indicates a greater throughput than the expected delivery performance, and wherein the updated expected delivery performance is used in a subsequent comparing step.

15. The transport manager system of claim 14, wherein the transport manager system is provided in a network equipment that is different than the content server.

16. The transport manager system of claim 14, wherein the transport manager system is provided in the content server, and wherein the first data packet and the data packets that are paced include data for the same media file.

17. The transport manager system of claim 14, wherein the first type of data flow is a data flow that persists for longer than a threshold amount of time.

18. A method, comprising:

examining a first data packet transmitted to a first network equipment from a second network equipment, the first network equipment and the second network equipment being remotely located from each other and linked by at least one network, the first network equipment including a mobile device, the second network equipment configured to monitor a plurality of mobile devices;

determining a data flow type of the first data packet, the data flow type including a first type of data flow and a second type of data flow;

if the data flow type is determined to be the first type of data flow, determining a delivery throughput of the first data packet to the first network equipment over a data flow path including a wireless link, the data flow path having a plurality of network nodes, the delivery performance relating to a data transfer rate to the first network equipment from the second network equipment over the data flow path;

receiving a network connection state of the data flow path from a mobile device monitored by the second network equipment;

comparing the determined delivery performance of the first data packet to an expected peak data throughput capacity for a data packet transmitted to the first network equipment from the second network equipment, the expected peak data throughput being based on the network connection state received from the mobile device; and pacing transmission of data packets to the first network equipment if the comparison of the determined delivery performance and the expected peak data throughput capacity indicates existence of a congestion over the data flow path between the first network equipment and the second network equipment.

19. The method of claim 18, wherein the second network equipment includes a transport manager system, the method further comprising:

selecting a mobile device from the plurality of mobile devices that are registered with the transport manager system, the selected mobile device being the mobile device from which the report is received; and prompting the selected mobile device to provide the report on the network connection state.

20. The method of claim 19, wherein the report provided by the selected mobile device includes information on radio link quality, a wireless network type, Wireless Fidelity, wireless operator, Base Station ID (BSID), or Service Set Identification (SSID), or a combination thereof.

* * * * *